(12) United States Patent
Schmidt et al.

(10) Patent No.: US 9,173,200 B2
(45) Date of Patent: Oct. 27, 2015

(54) COMMUNICATION TERMINAL, NETWORK COMPONENT, BASE STATION AND METHOD FOR COMMUNICATING

(71) Applicant: Intel Mobile Communications GmbH, Neubiberg (DE)

(72) Inventors: Andreas Schmidt, Braunschweig (DE); Maik Bienas, Braunschweig (DE); Martin Hans, Bad Salzdetfurth (DE)

(73) Assignee: Intel Mobile Communications GmbH, Neubiberg (DE)

( * ) Notice: Subject to any disclaimer, the term of this patent is extended or adjusted under 35 U.S.C. 154(b) by 143 days.

(21) Appl. No.: 13/779,874

(22) Filed: Feb. 28, 2013

(65) Prior Publication Data
US 2014/0241260 A1    Aug. 28, 2014

(51) Int. Cl.
*H04W 72/04* (2009.01)
*H04W 76/02* (2009.01)
*H04W 88/02* (2009.01)
*H04W 4/22* (2009.01)

(52) U.S. Cl.
CPC ............... *H04W 72/04* (2013.01); *H04W 4/22* (2013.01); *H04W 76/023* (2013.01); *H04W 88/02* (2013.01)

(58) Field of Classification Search
CPC ....... H04W 4/06; H04W 8/005; H04W 24/02; H04W 24/10; H04W 76/023
See application file for complete search history.

(56) References Cited

U.S. PATENT DOCUMENTS

| | | | |
|---|---|---|---|
| 2010/0009675 A1* | 1/2010 | Wijting et al. | 455/426.1 |
| 2011/0098043 A1* | 4/2011 | Yu et al. | 455/435.1 |
| 2012/0213183 A1* | 8/2012 | Chen et al. | 370/329 |
| 2012/0243431 A1* | 9/2012 | Chen et al. | 370/252 |
| 2013/0188552 A1* | 7/2013 | Kazmi et al. | 370/315 |
| 2013/0308551 A1* | 11/2013 | Madan et al. | 370/329 |
| 2014/0031028 A1* | 1/2014 | Yamada et al. | 455/419 |
| 2014/0247802 A1* | 9/2014 | Wijting et al. | 370/329 |
| 2014/0256334 A1* | 9/2014 | Kazmi et al. | 455/450 |

FOREIGN PATENT DOCUMENTS

WO    2011069295 A1    6/2011

OTHER PUBLICATIONS

3GPP TS 36.300 V10.7.0 (Mar. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 10); pp. 1-194.

(Continued)

*Primary Examiner* — Yong Zhou
(74) *Attorney, Agent, or Firm* — Schwabe, Williamson & Wyatt, P.C.

(57) ABSTRACT

In various aspects of this disclosure, a communication terminal may be provided. The communication device may include a cellular wide area radio communication technology circuit. The cellular wide area radio communication technology circuit may be configured to provide a communication in accordance with a cellular wide area radio communication technology. The communication device may further include a controller. The controller may be configured to manage radio resources for a cellular wide area radio communication connection based on radio resources that are provided or will be provided for a direct communication terminal device to communication terminal device communication bypassing a radio access network.

14 Claims, 19 Drawing Sheets

(56) References Cited

OTHER PUBLICATIONS

3GPP TS 36.331 V10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification; (Release 10); pp. 1-302.

3GPP TS 36.101 V10.6.0 (Mar. 2012); 3rd Generation Partnership Project; Technical Specification Group Radio Access Network; Evolved Universal Terrestrial Radio Access (E-UTRA); User Equipment (UE) radio transmission and reception (Release 10); pp. 1-312.

3GPP TR 22.803 V0.3.0 (May 2012) 3rd Generation Partnership Project; Technical Specification Group SA; Feasibility Study for Proximity Services (ProSe) (Release 12); pp. 1-24.

3GPP TS 36.306 V10.1.0 (Mar. 2011); 3rd Generation Partnership Project; Technical Specification Group Radio Access Network; Evolved Universal Terrestrial Radio Access (E-UTRA); User Equipment (UE) radio access capabilities; (Release 10); pp. 1-18.

3GPP TS 36.304 V10.5.0 (Mar. 2012); 3rd Generation Partnership Project; Technical Specification Group Radio Access Network; Evolved Universal Terrestrial Radio Access (E-UTRA); User Equipment (UE) procedures in idle mode (Release 10); pp. 1-33.

3GPP TS 36.321 V10.5.0 (Mar. 2012); 3rd Generation Partnership Project; Technical Specification Group Radio Access Network; Evolved Universal Terrestrial Radio Access (E-UTRA); Medium Access Control (MAC) protocol specification (Release 10); pp. 1-54.

3GPP TR 22.803 V1.0.0 (Aug. 2012) 3rd Generation Partnership Project; Technical Specification Group SA; Feasibility Study for Proximity Services (ProSe) (Release 12); pp. 1-33.

3GPP TS 36.306 V9.2.0 (Jun. 2010); 3rd Generation Partnership Project; Technical Specification Group Radio Access Network; Evolved Universal Terrestrial Radio Access (E-UTRA); User Equipment (UE) radio access capabilities (Release 9); pp. 1-16.

European Patent Office; International Search Report and Written Opinion for PCT App. No. PCT/EP2014/050708 mailed; Jul. 17, 2014; 5 pages.

Lei et al.; "Operator Controlled Device-to-Device Communications in LTE-Advanced Networks"; IEEE Wireless Communications; vol. 19, No. 3; Jun. 2012; pp. 96-104.

\* cited by examiner

COMMUNICATION TERMINAL, NETWORK COMPONENT, BASE STATION AND METHOD FOR COMMUNICATING

TECHNICAL FIELD

The present disclosure relates to a communication terminal, a network component, a base station and a method for communicating.

BACKGROUND

Communication terminal devices may directly communicate with base stations in a cellular radio communication system. Furthermore, communication terminal devices that are furthermore provided with a short range wireless transceiver, may communicate directly with other communication terminal devices nearby bypassing the cellular radio communication system.

Radio communication terminal devices (e.g. User Equipments (UEs)) that are residing in coverage of e.g. an LTE-FDD (Long Term Evolution Frequency Division Duplexing) cell, and want to engage in a direct e.g. TDD-based (Time Division Duplexing) UE-to-UE or device-to-device communication (D2D) in one of the frequency bands of the cell may be exposed to interference caused by traffic over the air interface (Uu interface) in the respective cell. At the same time, the D2D traffic over the UE-to-UE interface may also cause some, e.g. local (i.e. spatially restricted) interference for other UEs being served over the Uu interface.

SUMMARY

A communication device may be provided. The communication device may include a cellular wide area radio communication technology circuit. The cellular wide area radio communication technology circuit may be configured to provide a communication in accordance with a cellular wide area radio communication technology. The communication device may further include a controller. The controller may be configured to manage radio resources for a cellular wide area radio communication connection based on radio resources that are provided or will be provided for a direct communication terminal device to communication terminal device communication bypassing a radio access network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
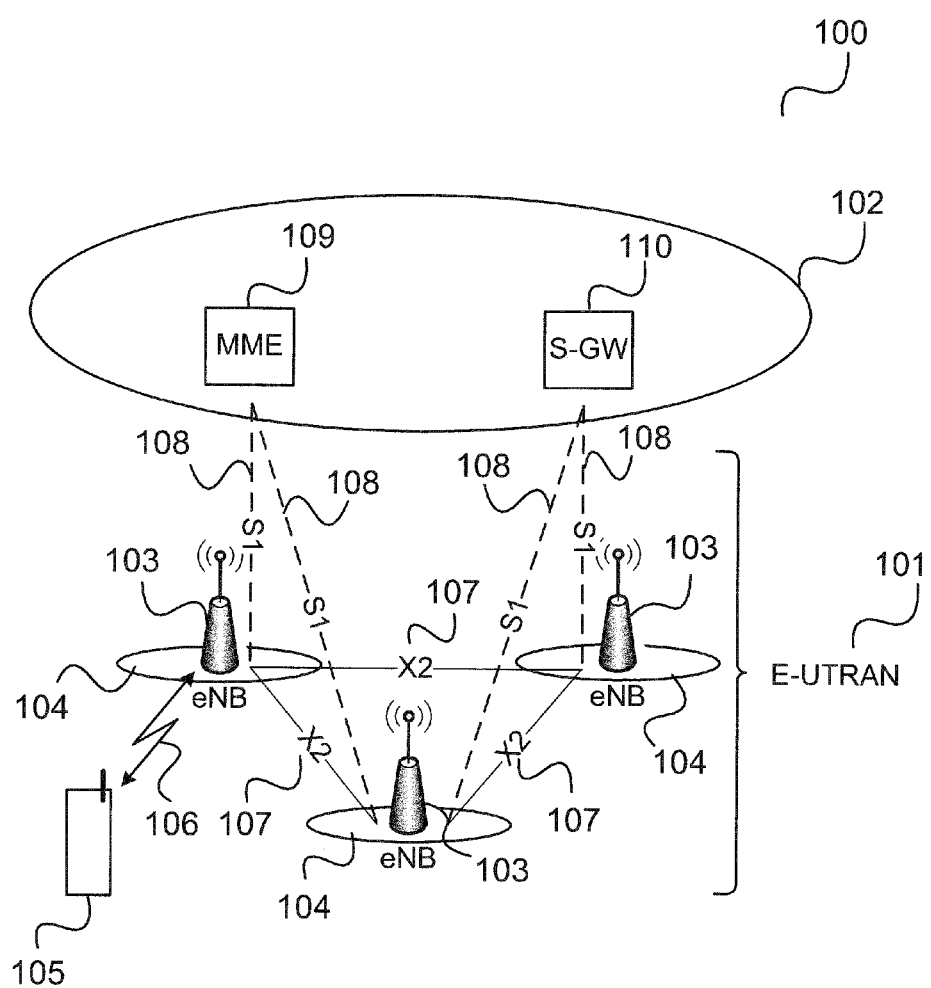
FIG. 1 shows a communication system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

A communication device (which may also be referred to as end device or communication end device or terminal device or communication terminal device) as referred to herein may be a device configured for wired communication, for example a desktop computer or laptop, or for wireless communication, for example a radio communication device. Furthermore, a radio communication device may be an end-user mobile device (MD). A radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

The communication device may include a memory which may for example be used in the processing carried out by the communication device. The communication terminal device may include a memory which may for example be used in the processing carried out by the communication terminal device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

The components of the communication device (e.g. the oscillator, the accuracy determiner, the signal detector, the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

Devices and methods may be provided for managing radio resources for a cellular wide area radio communication connection based on radio resources that are provided or will be provided for a direct communication terminal device to communication terminal device communication bypassing a radio access network.

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The term "protocol" is intended to include any piece of software, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

The communication protocol layers and its respective entities which will be described in the following may be implemented in hardware, in software, in firmware, or partially in hardware, and/or partially in software, and/or partially in firmware. In an aspect of this disclosure, one or more communication protocol layers and its respective entities may be implemented by one or more circuits. In an aspect of this disclosure, at least two communication protocol layers may be commonly implemented by one or more circuits.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU (International Telecommunication Union) recognized that current versions of LTE and other evolved 3G technologies that do not fulfill "IMT-Advanced" (IMT: international mobile telecommunications) requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

3GPP (3rd Generation Partnership Project) has introduced LTE-Advanced (i.e. LTE with some further enhancements, such as carrier aggregation functionality) into the Release 10 version of its suit of communication standards. This is the "real" '4G'.

In comparison with its predecessor UMTS (Universal Mobile Telecommunications System), LTE (Long Time Evolution) provides an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'.

A communication system that is used according to an aspect of this disclosure (for example a communication system according to LTE) is described in the following with reference to FIG. 1.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced).

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:
Functions for Radio Resource Management: Radio Bearer Control, Radio Admission Control, Connection Mobility Control, dynamic allocation of resources to UEs 105 in both uplink and downlink (scheduling);
IP header compression and encryption of user data stream;
Selection of an MME 109 at UE 105 attachment when no routing to an MME 109 can be determined from the information provided by the UE 105;
Routing of User Plane data towards Serving Gateway (S-GW) 110;
Scheduling and transmission of paging messages (originated from the MME);
Scheduling and transmission of broadcast information (originated from the MME 109 or O&M (Operation and Maintenance));
Measurement and measurement reporting configuration for mobility and scheduling;
Scheduling and transmission of PWS (Public Warning System, which includes ETWS (Earthquake and Tsunami Warning System) and CMAS (Commercial Mobile Alert System)) messages (originated from the MME 109); and
CSG (Closed Subscriber Group) handling.

Each base station of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A handover may also occur between base stations 103 operating according to different radio access technologies. This is illustrated in FIG. 2.

Figure 2:
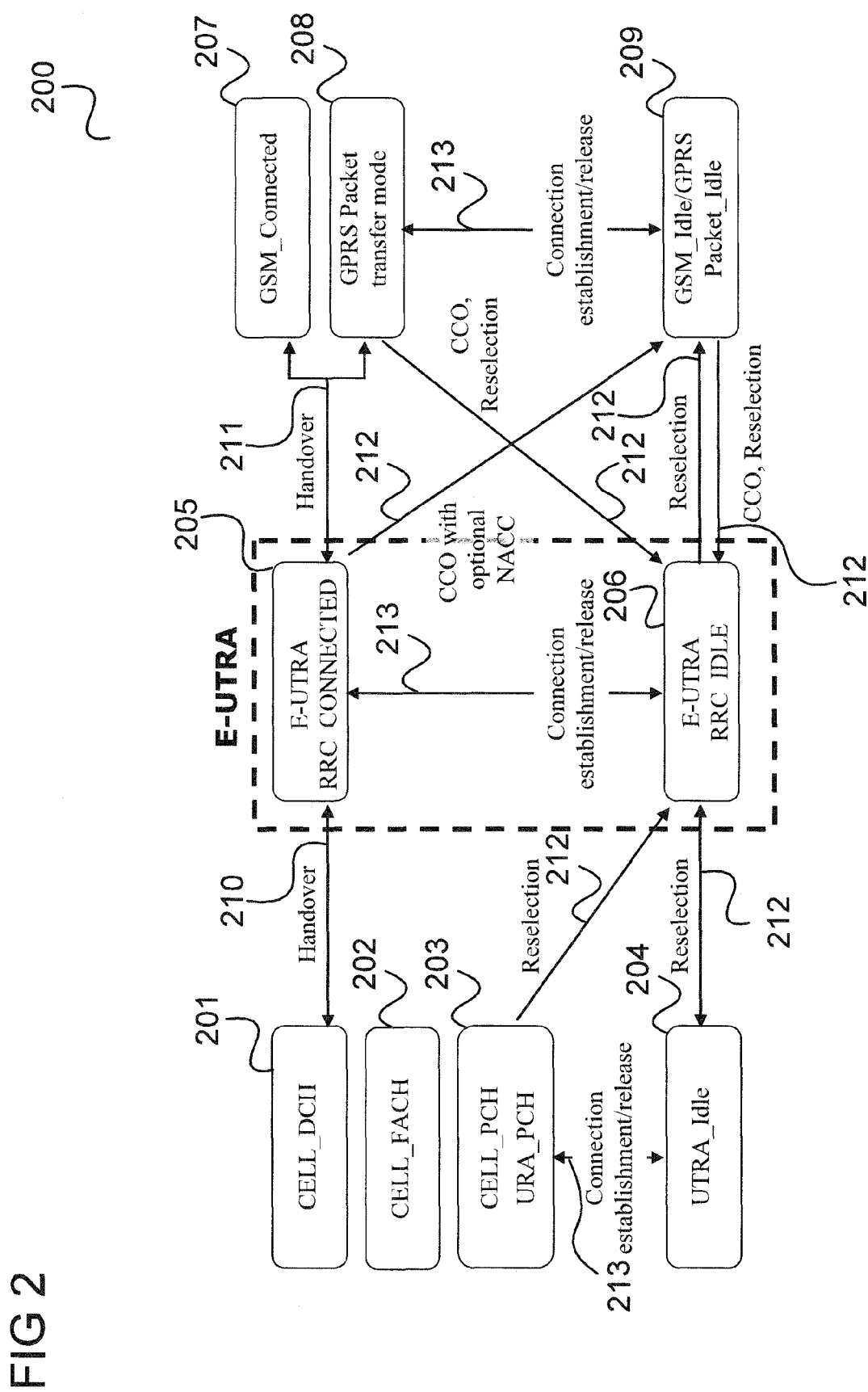
FIG. 2 shows a state diagram.

FIG. 2 shows a state diagram 200 for exemplary system in FIG. 1.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

The two RRC (Radio Resource Control) states RRC_IDLE and RRC_CONNECTED in E-UTRA can be described as follows:

RRC IDLE

Mobile terminal specific DRX (Discontinuous Reception) may be configured by upper protocol layers;

Mobility is controlled by the mobile terminal 105;

The mobile terminal 105 may acquire system information (SI);

monitors a paging channel to detect incoming calls and SI change;

performs neighboring cell measurements for the cell (re-)selection process.

RRC CONNECTED

A mobile terminal 105 is in RRC_CONNECTED when an RRC connection has been established.

Transfer of unicast data to/from the mobile terminal 105;

Mobility is controlled by the radio access network 101 (handover and cell change order);

The mobile terminal 105 may be configured with mobile terminal specific DRX (Discontinuous Reception) at lower protocol layers.

The mobile terminal 105 may acquire system information (SI);

monitors a paging channel and/or SIB (system information block) Type 1 content to detect SI change;

monitors control channels associated with the shared data channel to determine if data is scheduled for it;

performs neighboring cell measurements and measurement reporting to assist the network in making handover decisions;

provides channel quality and feedback information to the radio access network 101.

According to DRX the PDCCH (Physical Downlink Control Channel) monitoring activity of the mobile terminal 105 is controlled. On the PDCCH, various RNTIs (Radio Network Temporary Identifiers) can be found.

If the mobile terminal 105 is in RRC_IDLE state it is expected to listen to the P-RNTI (the so-called paging indicator) transmitted on the PDCCH which may announce the presence of a paging message on the PDSCH. If DRX is applied in RRC_IDLE, the mobile terminal 105 only needs to monitor one Paging Occasion (PO) per DRX cycle. System Information (SI) broadcast by the base station 103 controls DRX operation by specifying a mobile terminal specific paging cycle in SIB-Type2. (It should be noted that SIB (System Information Block)-Type2 is received by all mobile terminals camping in a given radio cell, but the equation used by a mobile terminal 105 in RRC_IDLE state to calculate its individual Paging Occasion (PO) has as input variable the subscriber's (i.e. mobile terminal's) unique IMSI (International Mobile Subscriber Identity)).

If DRX is configured in RRC_CONNECTED for a mobile terminal 105, the mobile terminal 105 is allowed to monitor the PDCCH (Physical Downlink Control Channel) discontinuously (in order to save energy); otherwise the mobile terminal 105 monitors the PDCCH continuously. The RRC (Radio Resource Control) layer controls DRX operation by configuring timers and parameters, for example as shown in table 1.

TABLE 1 longDRX-CycleStartOffset
The value of longDRX-Cycle is in number of sub-frames.
If shortDRX-Cycle is configured,
the value of longDRX-Cycle shall be a multiple of the shortDRX-Cycle TABLE 1-continued value. The value of drxStartOffset value is in number of sub-frames.
onDurationTimer
The value in number of PDCCH sub-frames.
drx-InactivityTimer
The value in number of PDCCH sub-frames.
drx-RetransmissionTimer
The value in number of PDCCH sub-frames.
shortDRX-Cycle
The value in number of sub-frames.
drxShortCycleTimer
The value in multiples of shortDRX-Cycle.

Figure 3:
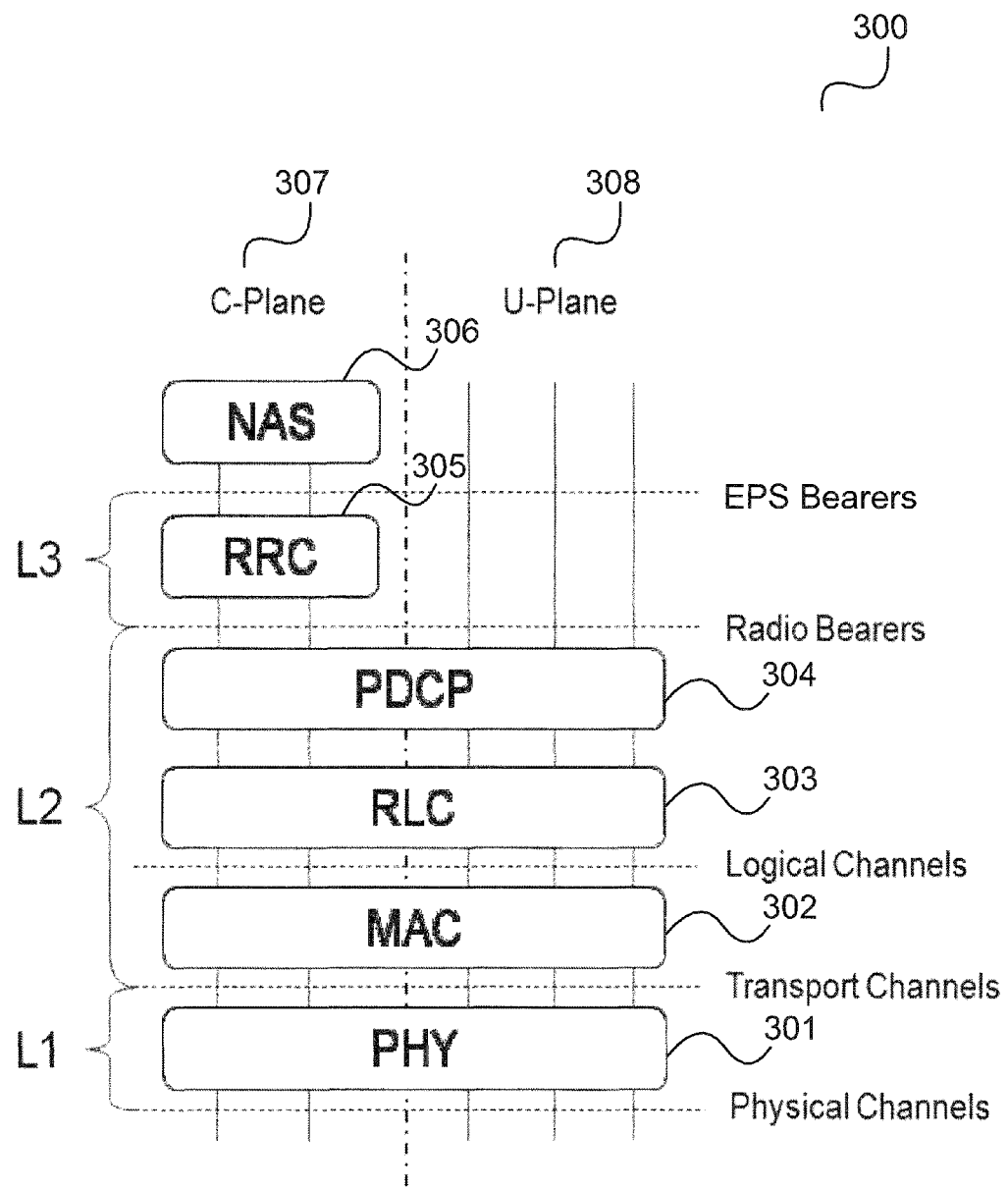
FIG. 3 shows a protocol structure.

The protocols for the C-Plane and the U-Plane of the E-UTRAN 101 according to LTE are illustrated in FIG. 3.

FIG. 3 shows a protocol structure 300 according to an aspect of this disclosure.

The LTE air interface (also referred to as Uu interface) is logically divided into three protocol layers. The entities ensuring and providing the functionality of the respective protocol layers are implemented both in the mobile terminal 105 and the base station 103. The bottom most layer is the physical layer (PHY) 301, which represents the protocol layer 1 (L1) according to the OSI (Open System Interconnection) reference model. The protocol layer arranged above PHY is the data link layer, which represents the protocol layer 2 (L2) according to the OSI reference model. In an LTE communication system, L2 consists of plurality of sublayers, namely the Medium Access Control (MAC) sublayer 302, the Radio Link Control (RLC) sublayer 303 and the Packet Data Convergence Protocol (PDCP) sublayer 304. The topmost layer of the Uu air interface is the network layer, which is the protocol layer 3 (L3) according to the OSI reference model and consists of the Radio Resource Control (RRC) layer 305 on the C-Plane 307. On the C-Plane 307, there is further the NAS (Non-Access Stratum) protocol layer 306.

Each protocol layer 301 to 306 provides the protocol layer above it with its services via defined service access points (SAPs). To provide a better understanding of the protocol layer architecture, the SAPs were assigned unambiguous names: The PHY 301 provides its services to the MAC layer 302 via transport channels, the MAC layer 302 provides its services to the RLC layer 303 via logical channels, and the RLC layer 303 provides its services to the RRC layer 305 and the PDCP layer 304 as data transfer as function of the RLC mode, i.e. TM (Transparent Mode), UM (Unacknowledged Mode) and AM (Acknowledged Mode). Further, the PDCP layer 304 provides its services to the RRC layer 305 and the U-Plane 308 upper layers via radio bearers, specifically as Signaling Radio Bearers (SRB) to the RRC 305 and as Data Radio Bearers (DRB) to the U-Plane 308 upper layers. According to LTE a maximum of 3 SRBs and 8 DRBs is currently supported.

The radio protocol architecture is not just split horizontally into the above-described protocol layers; it is also split vertically into the "control plane" (C-Plane) 307 and the "user plane" (U-Plane) 308. The entities of the control plane 307 are used to handle the exchange of signaling data between the mobile terminal 105 and the base station 103, which are required among other for the establishment, reconfiguration and release of physical channels, transport channels, logical channels, signaling radio bearers and data radio bearers, whereas the entities of the user plane 308 are used to handle the exchange of user data between the mobile terminal 105 and the base station 103. According to one aspect of this disclosure, in accordance with LTE, each protocol layer has particular prescribed functions:

The PHY layer 301 is primarily responsible for i) error detection on the transport channel; ii) channel encoding/decoding of the transport channel; iii) Hybrid ARQ soft combining; iv) mapping of the coded transport channel onto physical channels; v) modulation and demodulation of physical channels.

The MAC layer 302 is primarily responsible for i) mapping between logical channels and transport channels; ii) error correction through HARQ; iii) logical channel prioritization; iv) transport format selection.

The RLC layer 303 is primarily responsible for i) error correction through ARQ, ii) concatenation, segmentation and reassembly of RLC SDUs (Service Data Unit); iii) re-segmentation and reordering of RLC data PDUs (Protocol Data Unit). Further, the RLC layer 303 is modeled such that there is an independent RLC entity for each radio bearer (data or signaling).

The PDCP layer 304 is primarily responsible for header compression and decompression of IP (Internet Protocol) data flows, ciphering and deciphering of user plane data and control plane data, and integrity protection and integrity verification of control plane data. The PDCP layer 304 is modeled such that each RB (i.e. DRB and SRB, except for SRB0) is associated with one PDCP entity. Each PDCP entity is associated with one or two RLC entities depending on the RB characteristic (i.e. uni-directional or bi-directional) and RLC mode.

The RRC layer 305 is primarily responsible for the control plane signaling between the mobile terminal 105 and the base station 103 and performs among other the following functions: i) broadcast of system information, ii) paging, iii) establishment, reconfiguration and release of physical channels, transport channels, logical channels, signaling radio bearers and data radio bearers. Signaling radio bearers are used for the exchange of RRC messages between the mobile terminal 105 and the base station 103.

Figure 4:
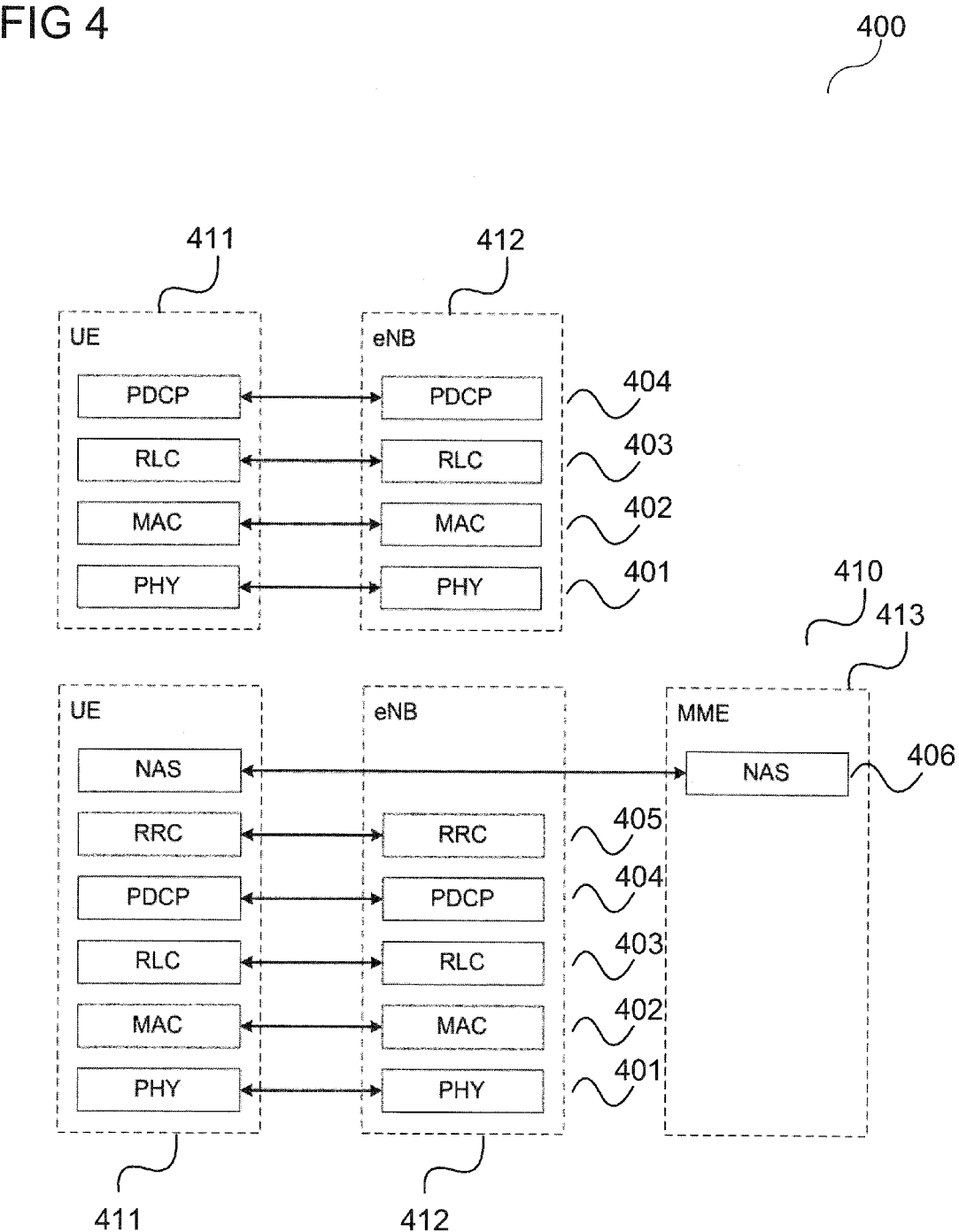
FIG. 4 shows a first protocol structure and a second protocol structure.

Differences between the C-Plane (control plane) 307 and the U-Plane (user plane) 308 according to E-UTRA (LTE) technology are depicted in FIG. 4. The RRC protocol and all lower layer protocols (PDCP, RLC, MAC, and PHY) terminate in the eNB, while the NAS protocol layer 306 terminates in the MME 109 in the EPC 102.

FIG. 4 shows a first protocol structure 400 and a second protocol structure 410.

The first protocol structure 400 corresponds to the U-Plane and the second protocol structure 410 corresponds to the C-Plane.

Analogously to the illustration as shown in FIG. 3, the protocol structures 400, 410 include a physical layer 401, a MAC layer 402, an RLC (Radio Link Control) layer 403, a PDCP layer 404, an RRC layer 405, and a NAS (Non-Access Stratum) protocol layer 406.

In the physical layer 401, the MAC layer 402, the RLC layer 403, the PDCP layer 404, and the RRC layer 405 the terminal points of the communication are the mobile terminal (UE) 411 and the base station (eNB) 412.

In the NAS protocol layer 406, the terminal points of the communication are the UE 411 and the MME 413.

With LTE the UMTS air interface is further optimized for packet data transmission by improving the system capacity and the spectral efficiency. However, the enhancements for LTE technology are not restricted to the air interface. The core network architecture for 3GPP's LTE wireless communication standard is also enhanced. This endeavor is commonly known as SAE (System Architecture Evolution).

SAE refers to the evolution of the GPRS Core Network, with some differences:
simplified architecture;
all IP (Internet protocol) Network (AIPN);
support for higher throughput and lower latency radio access networks (RANs);
support for, and mobility between, multiple heterogeneous RANs, including legacy systems as GPRS, but also non-3GPP systems (e.g. WiMAX);

According to the SAE architecture, the main component is the Evolved Packet Core (e.g. forming the core network of the communication system 100 illustrated in FIG. 1). The Evolved Packet Core (EPC) includes:
A Mobility Management Entity (MME): The MME is the key control-node for the LTE radio access network (E-UTRAN) and, according to LTE, holds the following functions:
NAS signaling;
NAS signaling security;
AS (Access Stratum) Security control;
Inter CN (Core Network) node signaling for mobility between 3GPP access networks;
Idle mode UE Reachability (including control and execution of paging retransmission);
Tracking Area List (TAL) management (for UE in idle and active mode);
PDN GW (Packet Data Network Gateway) and Serving GW selection;
MME selection for handovers with MME change;
SGSN (Serving GPRS (General Packet Radio System) Support Node) selection for handovers to 2G or 3G 3GPP access networks;
Roaming;
Authentication;
Bearer management functions including dedicated bearer establishment;
Support for PWS (which includes ETWS and CMAS) message transmission;
Optionally performing paging optimization.
A Serving Gateway (S-GW): The S-GW holds, according to LTE, the following functions:
The local Mobility Anchor point for inter-eNB handover;
Mobility anchoring for inter-3GPP mobility;
E-UTRAN idle mode downlink packet buffering and initiation of network triggered service request procedure;
Lawful Interception;
Packet routing and forwarding;
Transport level packet marking in the uplink and the downlink;
Accounting on user and QCI (QoS (Quality of Service) Class Identifier) granularity for inter-operator charging;
Uplink and Downlink charging per UE, PDN, and QCI.
A PDN Gateway (P-GW): According to LTE, the PDN Gateway provides connectivity from the UE to external packet data networks by being the point of exit and entry of traffic for the UE. A UE may have simultaneous connectivity with more than one P-GW for accessing multiple PDNs. The P-GW performs policy enforcement, packet filtering for each user, charging support, lawful Interception and packet screening. Another key role of the P-GW is to act as the anchor for mobility between 3GPP and non-3GPP technologies such as WiMAX and 3GPP2 (CDMA 1X and EvDO (Evolution Data Optimized)).

In the following, the network architecture of a communication system (e.g. a 3GPP communication system) with three different Radio Access Networks (RANs) is described with reference to FIG. 5 (for the non-roaming case).

Figure 5:
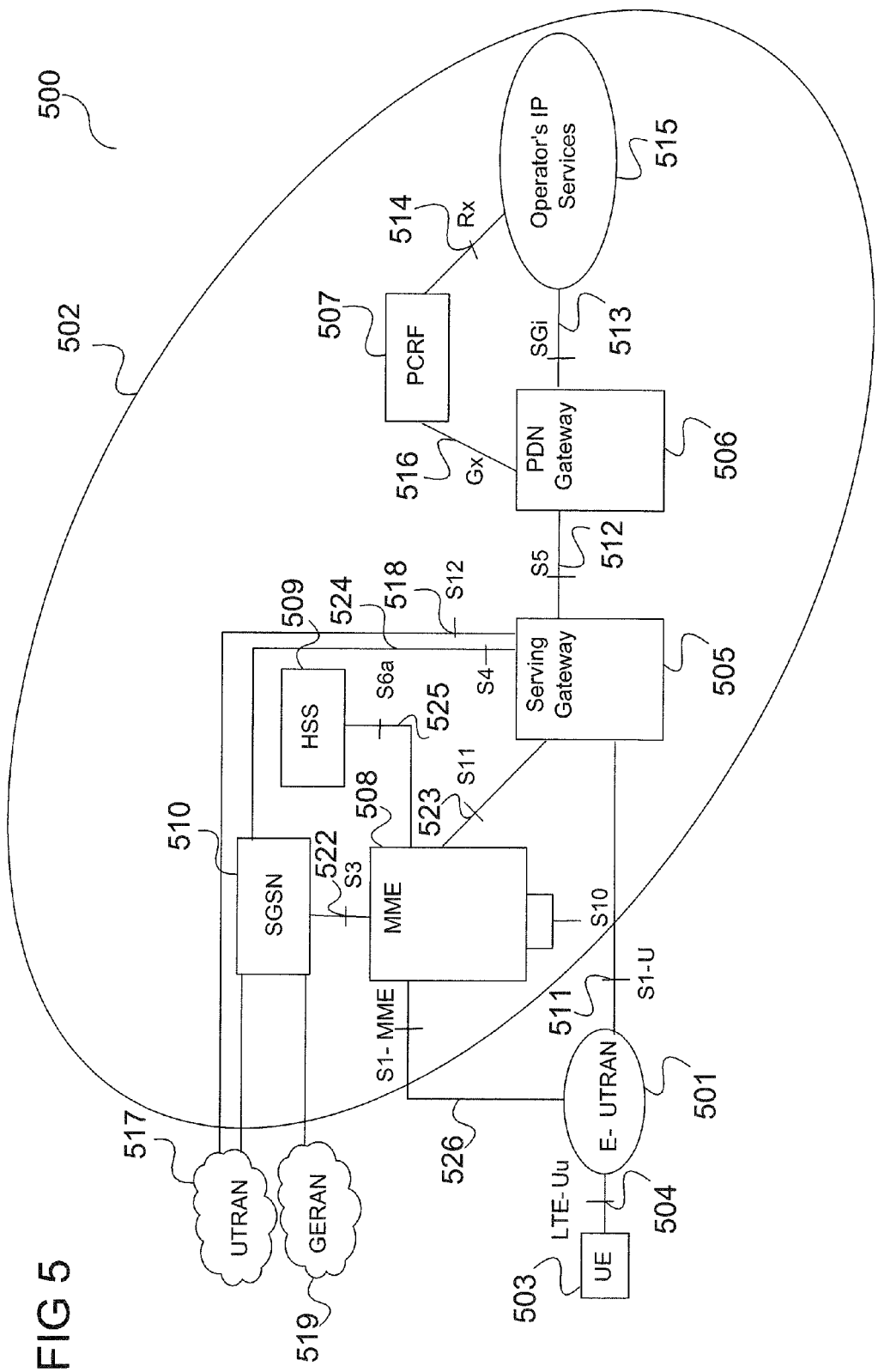
FIG. 5 shows a communication system in more detail.

FIG. 5 shows a communication system 500 according to an aspect of this disclosure.

The communication system 500 includes an E-UTRAN 501 and a core network 502.

The communication system 500 corresponds to the communication system 100 wherein in FIG. 1, the E-UTRAN 101, 501 is shown in higher detail while in FIG. 5, the core network 102, 502 is shown in higher detail.

A mobile terminal 503 which may correspond to the mobile terminal 105 may connect to the E-UTRAN 501 by means of an air interface (Uu interface) 504.

The core network 502 includes a Serving Gateway 505, a PDN (Packet Data Network) Gateway 506, a PCRF (Policy and Charging Rules Function) 507, an MME (Mobility Management Entity) 508, and a HSS (Home Subscriber Server) 509, an SGSN (Serving GPRS (General Packet Radio Service) Support Node) 510.

The E-UTRAN 501 exchanges information or commands with the Serving Gateway 505 by means of an S1-U interface 511. The Serving Gateway 505 is coupled to the PDN Gateway 506 by means of an S5 interface 512. The PDN Gateway 506 and the PCRF 507 may access IP (Internet Protocol) services 515 (i.e. may access, for example, corresponding servers) provided by the operator of the mobile communication system 500 by means of an SGi interface 513 and an Rx interface 514, respectively.

The PCRF 507 is coupled to the PDN Gateway 506 by means of a Gx interface 516. The Serving Gateway 505 is coupled by means of an S4 interface 524 with the SGSN 510. The Serving Gateway 505 may further be coupled to an UTRAN (i.e. a radio access network according to UMTS) 517 via a S12 interface 518. The MME 508 is coupled by means of an S6a interface 525 with the HSS 509. The MME 508 is further coupled by means of an S1-MME interface 526 to the E-UTRAN 501.

The SGSN 510 may support legacy access to the UTRAN 517 and/or a GERAN (GSM (Global System for Mobile Communications) EDGE (Enhanced Data Rates for GSM Evolution) Radio Access Network) 519. The SGSN 510 is coupled with the MME 508 via an S3 interface 522. The Serving Gateway 505 is coupled with the MME 508 via an S11 interface 523.

GERAN is also referred to as 2G and 2.5G. UTRAN is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN includes at least one NodeB (i.e. a UMTS base station) that is connected to at least one Radio Network Controller (RNC). An RNC provides control functionalities for one or more NodeBs. A NodeB and an RNC can be the same device, although typical implementations have a separate RNC located in a central location serving multiple NodeBs. An RNC together with its corresponding NodeBs are called the Radio Network Subsystem (RNS). There can be more than one RNS present per UTRAN.

The E-UTRAN 501 is the 3GPP Radio Access Network for LTE (3.9G) that is currently being worked on. The E-UTRA air interface uses OFDM for the downlink (i.e. for the transmission direction from the base station to the mobile terminal) and Single Carrier FDMA (SC-FDMA) for the uplink (i.e. for the transmission direction from the mobile terminal to the base station). It employs MIMO (Multiple Input Multiple Output) with up to four antennas per (base and user) station. The use of OFDM enables E-UTRA to be much more flexible in its use of spectrum than the older CDMA based systems, such as UTRAN. OFDM has a link spectral efficiency greater than CDMA, and when combined with modulation formats such as 64QAM, and techniques as MIMO, E-UTRA is expected to be considerably more efficient than W-CDMA (Wideband Code Division Multiple Access) with HSDPA (High Speed Downlink Packet Access) and HSUPA (High Speed Uplink Packet Access).

Figure 6:
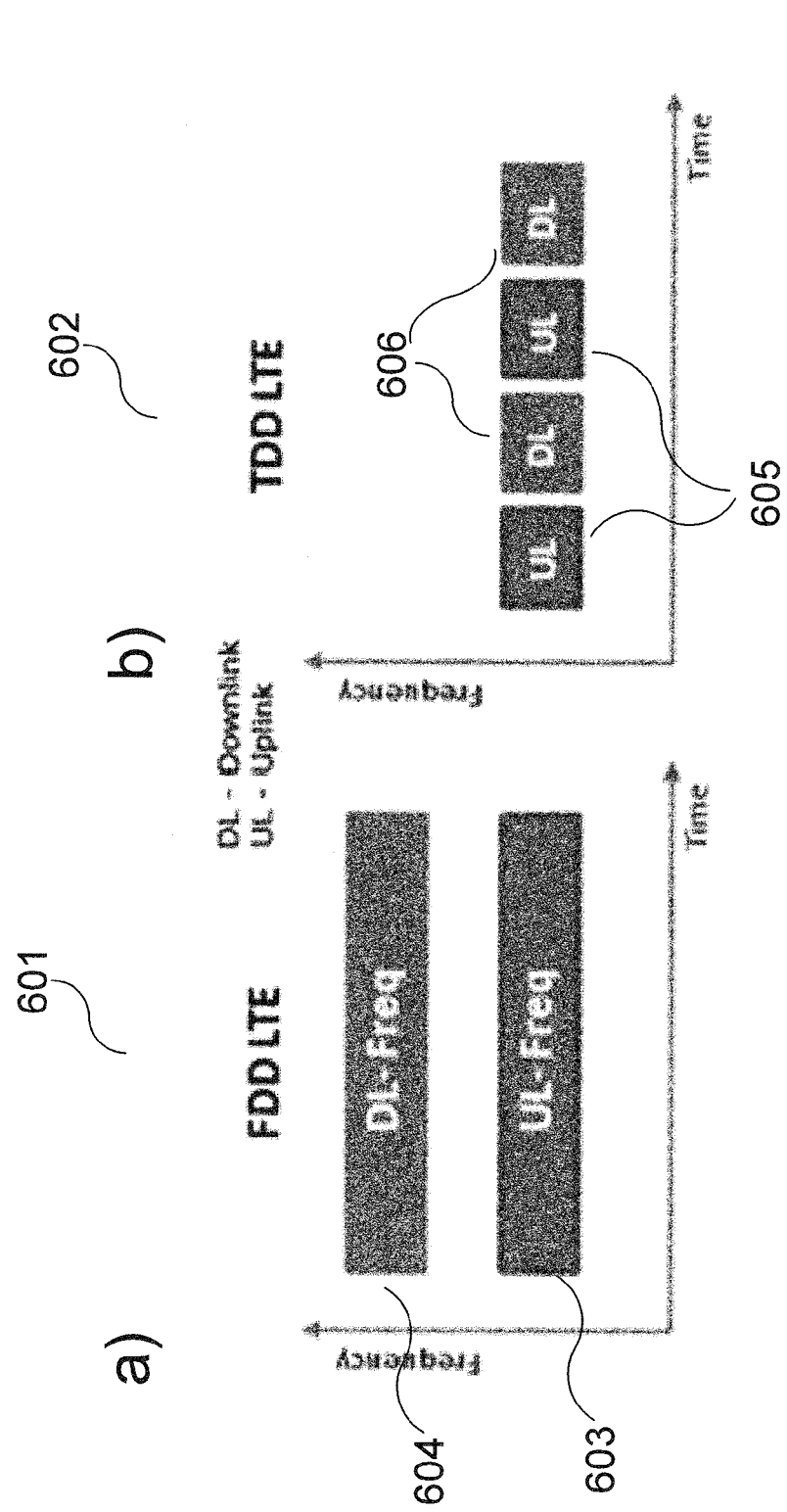
FIGS. 6a and 6b show a paired spectrum for UL/DL used with LTE-FDD and alternating UL/DL portions used with LTE-TDD, respectively.

FIG. 6a and FIG. 6b show diagrams illustrating the frequency spectrum described by 3GPP LTE specification. FIG. 6a shows a diagram 601 illustrating the use of Frequency Division Duplexing (FDD). FIG. 6b shows a diagram 602 illustrating the use of Time Division Duplexing (TDD) to separate uplink (UL) and downlink (DL) traffic. Frequency Division Duplexing (FDD) uses for uplink and downlink a paired spectrum with two distinct frequency bands 603, 604. The downlink frequency band 603 is separated from the uplink frequency band 604. Time Division Duplexing (TDD) uses alternating resource portions for Uplink 605 and Downlink 606 in the same frequency band. In one aspect of this disclosure, Time Division Duplexing (TDD) may use alternating uplink portions 605 and downlink portions 606 in the same frequency band as used by the uplink frequency band in the Frequency Division Duplexing (FDD) shown in FIG. 6a. In various aspects of this disclosure, the frequency band used for the alternating uplink portions 605 and downlink portions 606 may be the same frequency band as used by the downlink frequency band in the Frequency Division Duplexing (FDD).

Figure 7:
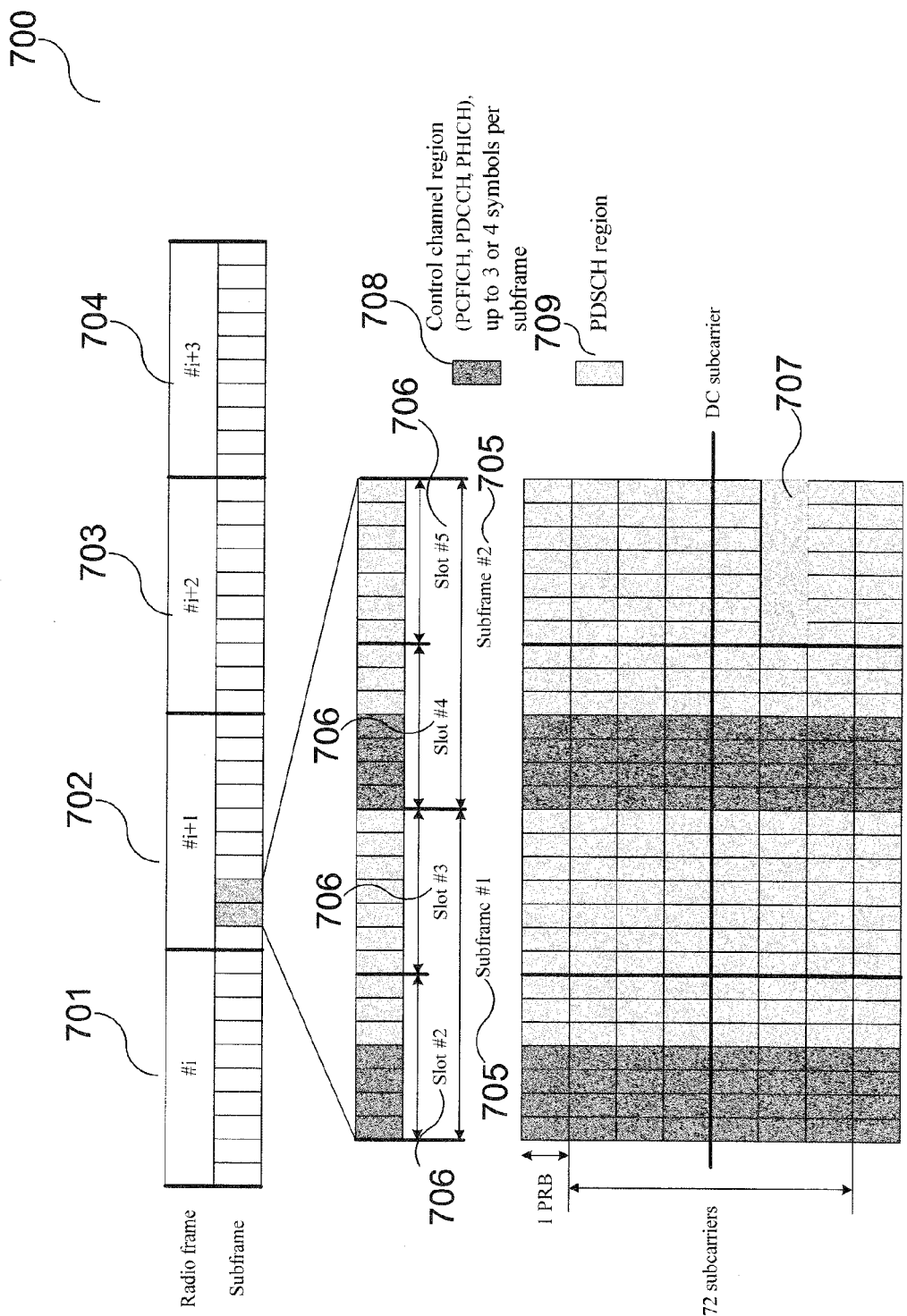
FIG. 7 shows a downlink resource grid in LTE.

FIG. 7 shows an allocation 700 of a frequency band used for the downlink communication path in LTE.

In the downlink communication path Orthogonal Frequency Division Multiple Access (OFDMA) is used in combination with Time Division Multiple Access (TDMA).

In the time domain, the LTE transmissions are organized into frames 701, 702, 703, 704 of e.g. 10 msec length. Each frame 701, 702, 703, 704 may be composed of 10 subframes 705 also known as Transmission Time Interval (TTI) of e.g. 1 msec duration. The first three to four symbols of a subframe 705 may be reserved for physical control channels 708 (such as PCFICH, PDCCH, PHICH). The last ten to eleven symbols may make up the shared channel region where the actual user data is transmitted on the PDSCH 709. Each subframe 705 may be made up of two equal sized time slots 706 of 0.5 msec each. Each time slot 706 may be composed of 7 or 6 OFDM symbols depending upon whether a short or long Cyclic Prefix (CP) has been used. A resource block 707 is shown in more detail in FIG. 8.

Figure 8:
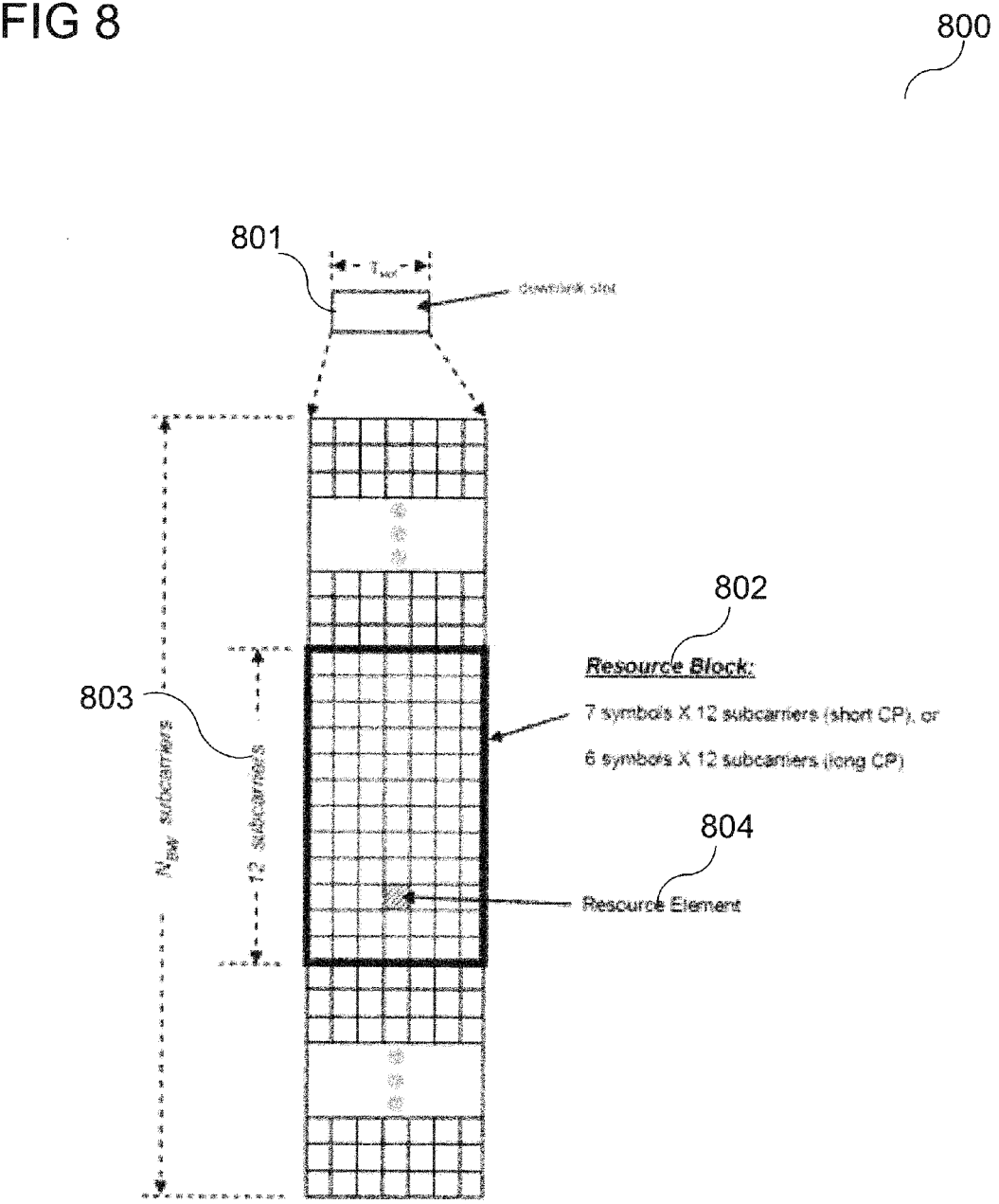
FIG. 8 shows a more detailed view of a downlink resource grid of LTE.

FIG. 8 shows a resource block 800 of FIG. 7 in more detail.

A group of 12 subcarriers 803 over one time slot 801 may be referred to as a Resource Block 802 (RB). The smallest unit of resource may be referred to as the Resource Element 804 which is composed of one subcarrier and one OFDM symbol. Thus, a Resource Block 802 may have 12×7=84 and 12×6=72 Resource Elements 804 for short and long CP respectively.

Figure 9:
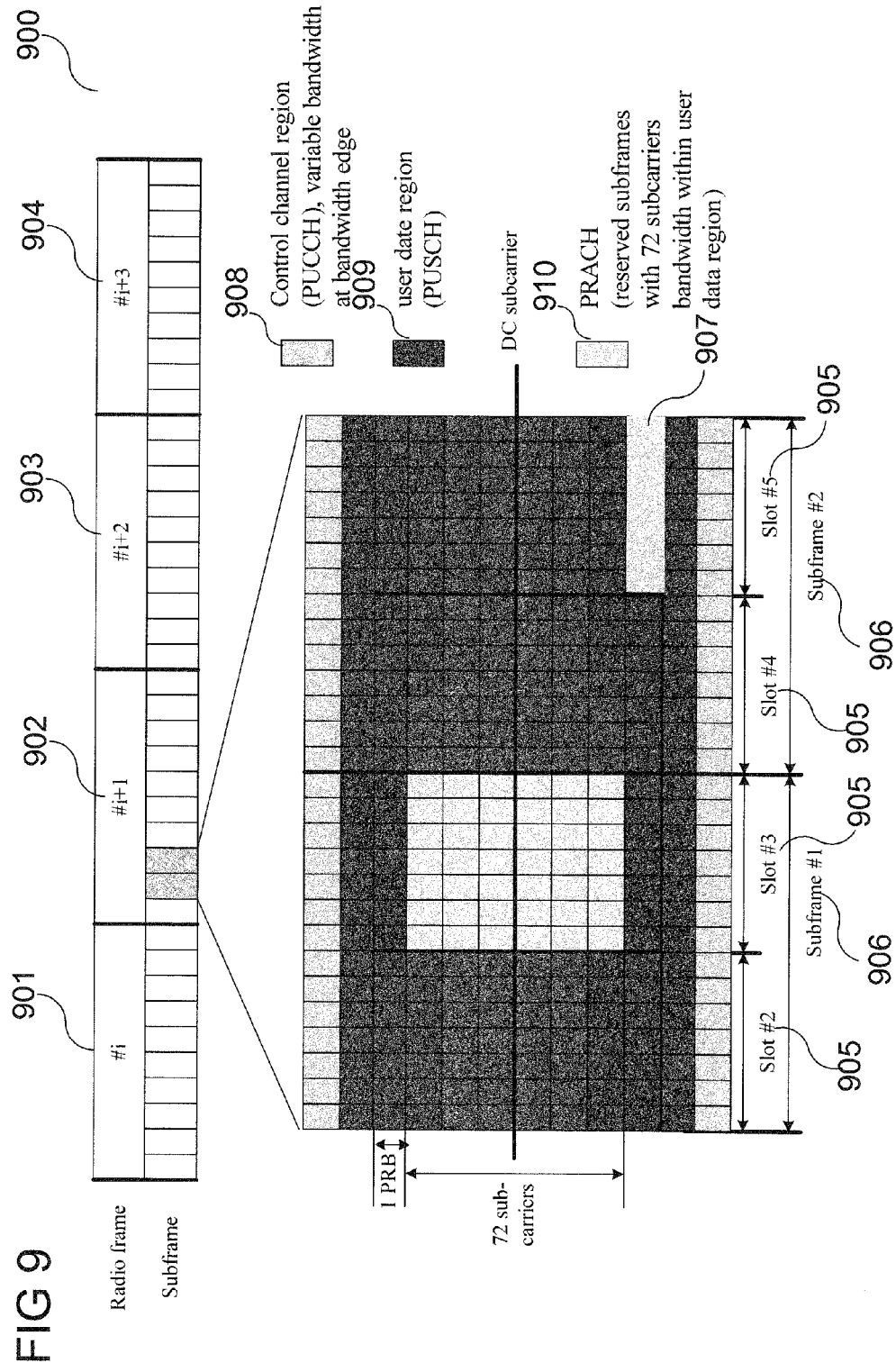
FIG. 9 shows as uplink resource grid in LTE.

FIG. 9 shows an allocation 900 of a frequency band used for the uplink communication path in LTE.

In the uplink communication path, Single Carrier Frequency Division Multiple Access (SC-FDMA) may be used in combination with Time Division Multiple Access (TDMA). As SC-FDMA can be regarded as conventional OFDM with a DFT-based precoder, the resource grid for the uplink may be similar to the one for the downlink, as is illustrated in FIG. 7.

In the time domain, the LTE transmissions may be organized into frames 901, 902, 903, 904 of e.g. 10 msec length each. Each frame 901, 902, 903, 904 may be composed of 10 subframes 906, also known as Transmission Time Interval (TTI), of e.g. 1 msec duration. Each subframe 906 may be made up of two equal sized time slots 905 of 0.5 msec each. Each time slot 905 may be composed of 7 or 6 SC-FDMA symbols depending upon whether a short or long Cyclic Prefix (CP) has been used. A control channel region 908 (PUCCH) with variable bandwidth may be located at the upper and lower edge of the bandwidth and may stretch over the entire length of a subframe. The user data region 909 (PUSCH) may be located between the control channel regions. The PRACH 910 resources for Random Access may fall into the PUSCH 909 region. A subframe 906 with for example 72 subcarriers bandwidth may be reserved for PRACH 910 resources within the user data region. A resource block 907 may be shown in more detail in FIG. 10.

Figure 10:
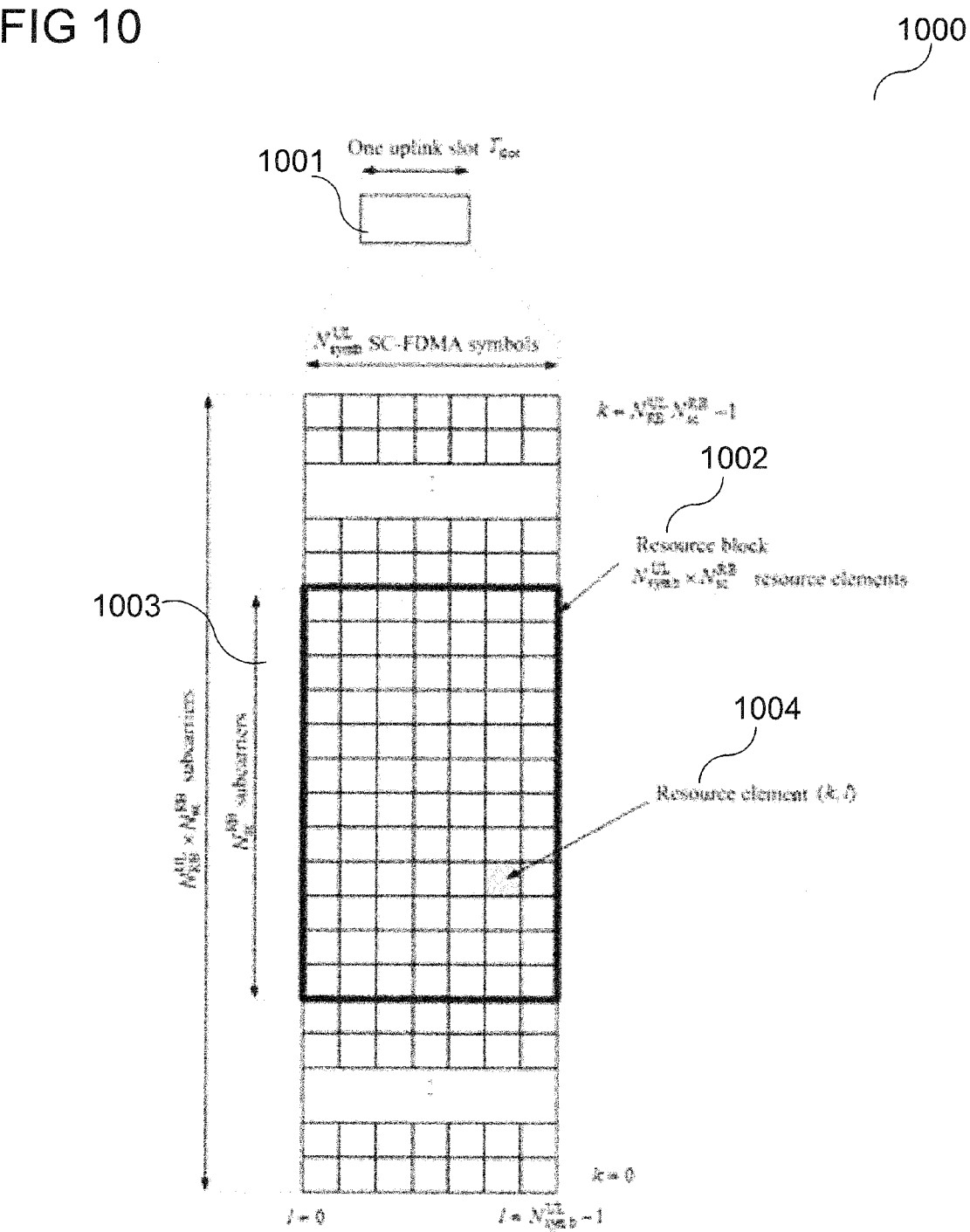
FIG. 10 shows a more detailed view of an uplink resource grid of LTE.

FIG. 10 shows a resource block 1000 of FIG. 9 in more detail.

A group of in general 12 subcarriers 1003 over one time slot 1001 is referred to as a Resource Block 1002 (RB). The smallest unit of resource is termed as the Resource Element 1004 which is composed of one subcarrier and one SC-FDMA symbol. Thus, a Resource Block 1002 may have in general 12×7=84 and 12×6=72 Resource Elements 1004 for short and long CP respectively.

Figure 11:
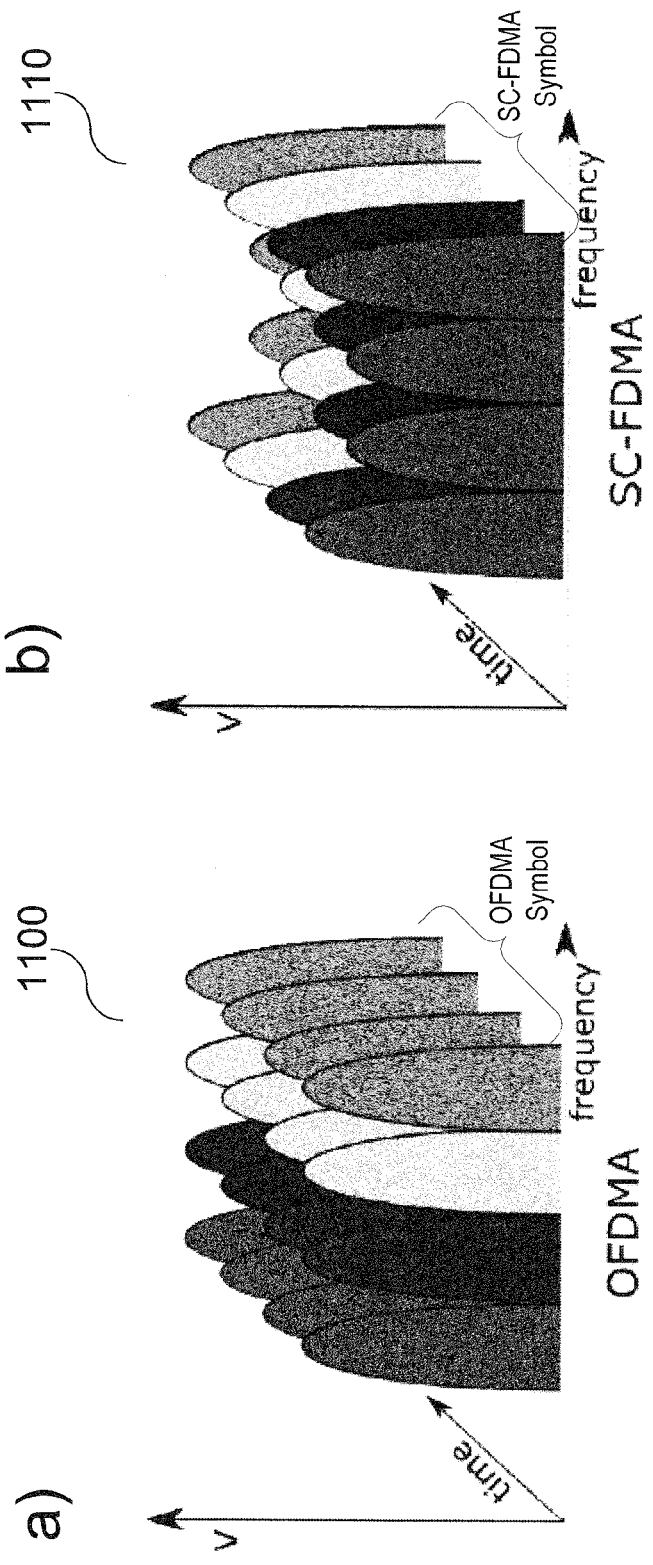
FIG. 11 shows a comparison of OFDMA and SC-FDMA.

FIG. 11a and FIG. 11b show how a series of QPSK symbols (here: a series of four) are mapped into time and frequency by the two different modulation schemes, FIG. 11a for OFDMA (Orthogonal Frequency Division Multiple Access) in a first time and frequency diagram 1100 and FIG. 11b for SC-FDMA (Single Carrier-Frequency Division Multiple Access) in a second time and frequency diagram 1110.

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower).

OFDMA may be seen simply as an elaboration of OFDM used by LTE and other systems that increases system flexibility by multiplexing multiple users onto the same subcarriers. This can benefit the efficient trunking of many low-rate users onto a shared channel as well as enable per-user frequency hopping to mitigate the effects of narrowband fading. For reasons of clarity, the example provided here uses only four (N) subcarriers over one symbol period with the payload data represented by QPSK modulation. Real LTE signals are allocated in units (resource blocks) of e.g. 12 adjacent subcarriers (180 kHz) that last for 0.5 ms and usually contain six or seven symbols whose modulation can be QPSK, 16QAM or 64QAM. Another number of subcarriers may also be provided in alternative implementations.

Figure 12:
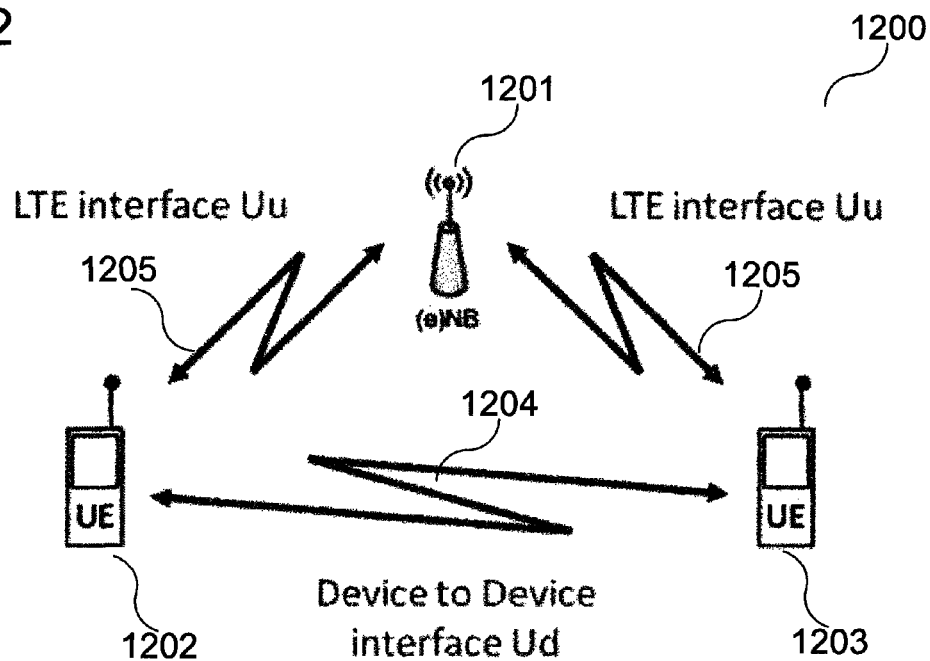
FIG. 12 shows a communication system illustrating a D2D communication connection.

FIG. 12 shows a communication system 1200 with a first communication terminal device 1202 (UE) and a second communication terminal device 1203 (UE) having established a direct communication terminal device to communication terminal device communication connection 1204 (D2D) bypassing a radio access network according to an aspect of this disclosure. A base station 1201 (eNB), also referred to herein as communication device, may be part of a communication network as described with reference to FIG. 1.

Direct UE-to-UE Communication may also be referred to as "Device-to-Device Communication" or "D2D Communication". There are in principle two alternatives to realize such a direct communication path between mobile devices: the D2D air interface 1204 (Ud) may be realized by some type of short range technology, such as e.g. Bluetooth or WiFi, or by re-using the LTE-TDD flavor of the LTE technology.

For direct UE-to-UE Communication TDD has many benefits over FDD (by way of example, the same channel characteristics for the transmission path and reception path can be anticipated, and channel estimation using closed loop principles is not needed, etc.).

By way of example, mobile devices that are residing in coverage of an LTE-FDD cell, and that want to engage in a direct TDD-based UE-to-UE communication in one of the frequency bands of the radio cell are exposed to interference caused by traffic over the Uu interface 1205 in this radio cell. At the same time the D2D traffic over the Ud interface 1205 sourced by these types of D2D-UEs 1202, 1203 may also cause some (local) interference in the DL or UL band of the radio cell for other UEs being served over the Uu interface 1205.

Alternatively, two UEs 1202, 1203 in RRC_IDLE may be camping on the same base station. At some point in time the two UEs 1203, 1203 may detect that they are in close proximity and that their D2D technologies would enable direct exchange of data over the Ud interface 1204.

In one case, the base station's 1201 preference for D2D communication (here: the DL band) is made known via System Information (SI) broadcast in the radio cell. Two UEs 1202, 1203 that want to engage in direct UE-to-UE communication simply start transmitting D2D traffic in that DL band of the cell they are camping on, and can then be "re-configured" by the base station, if interference is detected.

The allowed frequency bands (here: for example DL only) for uncoordinated direct UE-to-UE D2D communication may be broadcast in System Information (SI). The allowed radio resources (in time and frequency) to be used for device discovery may be broadcast in System Information (SI). Based on measurement reports transmitted by "other" UEs and/or missing acknowledgements in UL direction the base station 1201 may detect D2D activity in the FDD-LTE DL band in its radio cell. The base station 1201 may directly signal the resources that can be used for exchange of user data via D2D communication (i.e., D2D UEs may be informed directly about freed resources they are allowed to use/not allowed to use when looking at it from a different angle). Base station 1201 may use SI broadcast to inform UEs about the freed resources for D2D.

Figure 17:
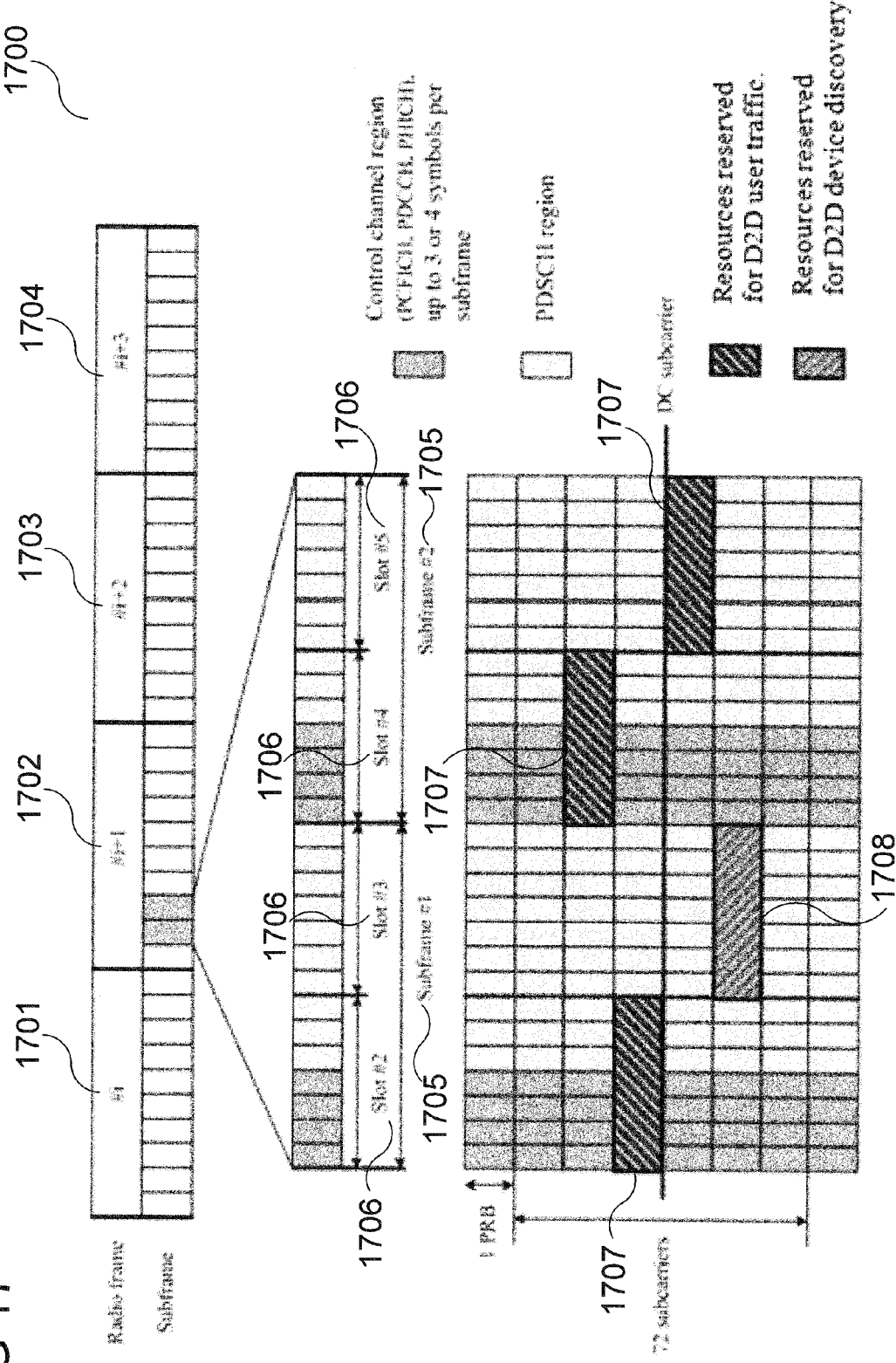
FIG. 17 shows a resource grid of LTE with resource assignment for D2D communication.

From RRM (radio resource management) measurements or missing acknowledgments on matching UL channels the bases station may determine that some UEs in a given radio cell suffer from severe interference in the DL. The base station 1201 may conclude that the interference or missing acknowledgements come(s) from direct UE-to-UE communication taking place in for example the DL resource somewhere in (one of) its radio cell(s). In order to mitigate the interference the base station 1201 may decide to assign a certain portion of the DL resource grid for D2D communication (which is different from the interfered resource). For instance, the base station 1201 may decide to exempt certain DL resources from "normal" UEs' DL transmissions as shown in FIG. 17 (rough granularity at Resource Block layer) and FIG. 18 (fine granularity at Resource Element layer). This exemption of resources for "normal" traffic over the Uu interface (or allocation of resources for D2D traffic over the Ud interface when looking at it from a different angle) may then be signalled via System Information (SI) broadcast from the base station 1201 to all UEs 1202, 1203 in the radio cell (e.g., by pairs of parameters consisting of "slot number" and "resource block identifier", or "slot number" and "subcarrier identifier", or alike). In some scenarios it may be beneficial to additionally signal a validity period via System Information (SI) broadcast (e.g., the validity of this configuration can be expressed in number of slots or frames or in seconds) indicating that this new DL resource assignment is limited in time. In the example described above, the explicit signalling of resource allocation for D2D traffic may be received by all UEs 1202, 1203 in coverage of the corresponding radio cell, regardless of whether the UEs 1202, 1203 are residing in RRC_CONNECTED or in RRC_IDLE. The explicit signalling of resource allocation for D2D traffic may also be realized by means of dedicated communication channels to a subset of UEs while these are residing in RRC_CONNECTED.

System information may be divided into the Master Information Block (MIB) and a number of System Information Blocks (SIBs). The MIB may include a limited number of most essential and most frequently transmitted parameters that are needed to acquire other information from the radio cell, and may be transmitted on BCH (Broadcast Channel).

SIBs other than SIB-Type1 may be carried in System Information (SI) messages and mapping of SIBs to SI messages may be flexibly configurable by the schedulingInfoList IE (Information Element) included in SIB-Type1, with possible restrictions that: each SIB should not be spread over more than one SI message, only SIBs having the same scheduling requirement (periodicity) can be mapped to the same SI message, and SIB-Type2 is always mapped to the SI message that corresponds to the first entry in the list of SI messages in the schedulingInfoList IE. There may be multiple SI messages transmitted with the same periodicity. SIB-Type1 and all SI messages are transmitted on DL-SCH.

For the new signaling method SIB-Type-2 may be enhanced, because it contains general radio resource configuration information that is common for all UEs.

In SIB-Type-2 a new Information Element, namely D2DFrequencyband may be added to indicate to all UEs in the cell which of the LTE-FDD band is the band of choice for D2D communication.

Alternatively, or in addition to the previously described Information Element, in SIB-Type-2 three new Information Elements may be added, namely D2DConfigValidityPeriod for indicating the inventive validity period of the temporary D2D resource assignment, D2DResourceConfigCommon for specifying details of the affected D2D resources used for user data, and D2DDiscoveryResourcesConfigCommon for specifying details of the affected D2D resources used for device discovery. The latter two (i.e., D2DResourceConfigCommon or D2DDiscoveryResourcesConfigCommon) may be composed by utilizing the ResourceIdentifier Information Element which may be some sort of container in which at least one Information Element is included to specify at least one of a resource in the frequency domain and a resource in the time domain. The existing radioResourceConfigCommon already defined for more static information pertaining to random access parameters and physical layer parameters may be kept untouched.

Consequently, the resulting SIB-Type-2 may be as follows:

```
-- ASN1 START
SystemInformationBlockType2 ::=                              SEQUENCE
    ac-BarringInfo              SEQUENCE {
    ac-BarringForEmergency                      BOOLEAN,
    ac-BarringForMO-Signalling                  AC-BarringConfig                OPTIONAL
    ac-BarringForMO-Data                        AC-BarringConfig                OPTIONAL
    }                                                                            OPTIONAL
    radioResourceConfigCommon                               RadioResourceConfigCommonSIB,
    D2DFrequencyBand                            ENUMERATED (DL, UL)
    ue-TimersAndConstants                       UE-TimersAndConstants,
    freqInfo        SEQUENCE {
    ul-CarrierFreq              ARFCN-ValueEUTRA                                OPTIONAL
    ul-Bandwidth                ENUMERATED {n6, n15, n25, n50, n75,n100}
                                                                                OPTIONAL
        additionalSpectrumEmission                          AdditionalSpectrumEmission
    },
    mbsfn-SubframeConfigList                    MBSFN-SubframeConfigList OPTIONAL
    timeAlignmentTimerCommon                            TimeAlignmentTimer,
    D2DConfigValidityPeriod                             ENUMERATED {s4, s8, . . . , s128,
s256, s512}
    D2DDiscoveryResourcesConfigCommon                           SEQUENCE (SIZE (1..max))
OF ResourceIdentifier
    D2DResourceConfigCommon                         SEQUENCE (SIZE (1..max)) OF
ResourceIdentifier
    . . . ,
    lateNonCriticalExtension                    OCTET STRING                    OPTIONAL
    [[ ssac-BarringForMMTEL-Voice-r9                        AC-BarringConfig    OPTIONAL
    ssac-BarringForMMTEL-Video-r9                                       AC-BarringConfig
                                                                                OPTIONAL
    ]],
    [[ ac-BarringForCSFB-r10                                            AC-BarringConfig
                                                                                OPTIONAL
    ]]
}
ResourceIdentifier ::=                          SEQUENCE {
    RadioFrameIdentifier                                        INTEGER (0..xx) OPTIONAL
    SubFrameIdentifier                                          INTEGER (0..9)  OPTIONAL
    SlotIdentifier                                              INTEGER (0..19) OPTIONAL
```

```
SymbolIdentifier                                                    to be defined       OPTIONAL
ResourceBlockIdentifier                                             to be defined       OPTIONAL
ResourceElementIdentifier                                           to be defined       OPTIONAL
SubCarrierIdentifier                                                INTEGER (0..71)     OPTIONAL
}
AC-BarringConfig ::=                          SEQUENCE {
ac-BarringFactor                              ENUMERATED {
                                              p00, p05, p10, p15, p20, p25, p30, p40,
                                              p50, p60, p70, p75, p80, p85, p90, p95},
ac-BarringTime                                ENUMERATED {s4, s8, s16, s32, s64,
s128, s256, s512},
ac-BarringForSpecialAC                                              BIT STRING (SIZE(5))
}
MBSFN-SubframeConfigList ::=                                        SEQUENCE (SIZE (1..maxMBSFN-
Allocations)) OF MBSFN-rf32, rf64, rf128, rf256},
nB                                                                  ENUMERATED {fourT, twoT,
oneT, halfT, quarterT, oneEighthT,oneSixteenthT, oneThirtySecondT}
}
UL-CyclicPrefixLength ::=                                           ENUMERATED {len1, len2}
-- ASN1STOP
```

Figure 18:
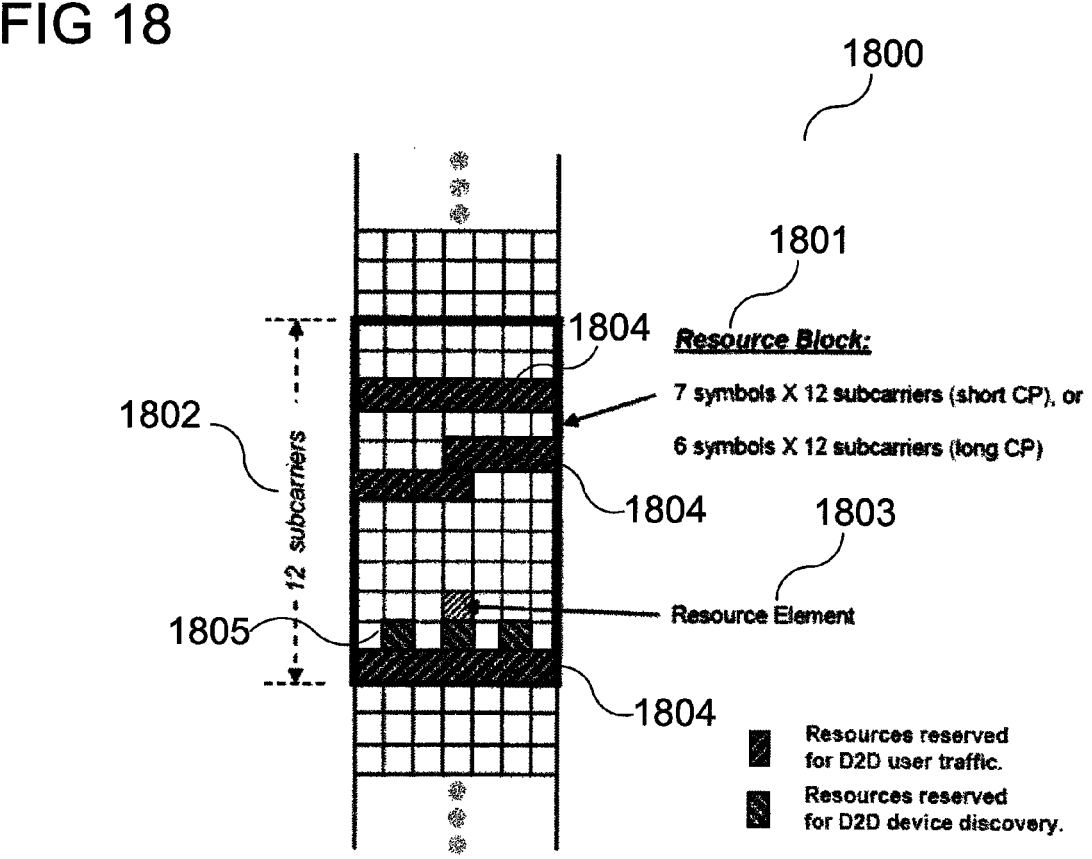
FIG. 18 shows a view of a resource grid with a pattern of resource elements within a slot reserved for D2D communication.

The example encoding given above ("explicit resource allocation") utilizing the ResourceIdentifier Information Element (e.g., for one of the D2DResourceConfigCommon Information Element for specifying details of the affected D2D resources allocated to user data, and the D2DDiscoveryResourcesConfigCommon Information Element for specifying details of the affected D2D resources allocated to device discovery) gives all flexibility needed. For example, different parameter combinations are possible, such as combining "slot identifier" with "sub carrier" or "resource block" with "frame identifier" and so on. Other (possibly more restrictive) encoding variant in SIB-Type2 are also possible. In FIG. 17 and FIG. 18 two example patterns are shown.

Figure 13:
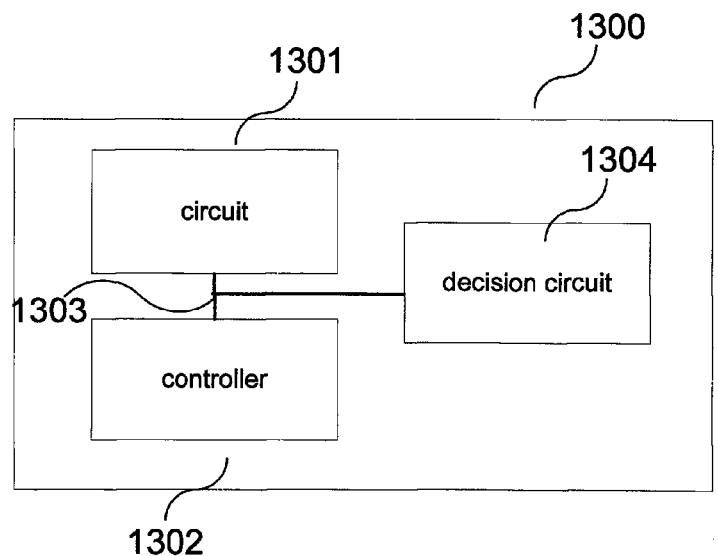
FIG. 13 shows a communication device.

FIG. 13 shows a communication device 1300.

The communication device 1300 may include a cellular wide area radio communication technology circuit 1301. The circuit 1301 may be configured to provide a communication in accordance with a cellular wide area radio communication technology. The communication may be a cellular wide area radio communication between the communication terminal device and a base station of a cellular wide area radio communication network. The communication device 1300 may further include a controller 1302. The controller 1302 may be configured to manage radio resources for a cellular wide area radio communication connection based on radio resources provided or will be provided for a direct communication terminal device to communication terminal device communication bypassing a radio access network. The cellular wide area radio communication technology circuit 1301 and the controller 1302 may be coupled with each other via a connection 1303 (e.g. a cable, and the like).

The controller of the communication device may further be configured to detect a direct communication terminal device to communication terminal device communication bypassing a radio access network.

The controller of the communication device may further be configured to detect a direct communication terminal device to communication terminal device communication in at least one of an uplink and downlink frequency band of a frequency division duplex (FDD) based communication of the communication device in accordance with the cellular wide area radio communication technology.

The controller of the communication device may further be configured to release frequency resources upon detection of a direct communication terminal device to communication terminal device communication.

The controller of the communication device may further be configured to block frequency resources upon detection of a direct communication terminal device to communication terminal device communication.

The communication device may further include a decision circuit 1304. The decision circuit may be configured to decide, based upon information received from the controller, whether at least one of downlink radio resources and uplink radio resources (for example, at least one of a downlink frequency band, and an uplink frequency band) can be assigned for a direct communication terminal device to communication terminal device communication.

The communication device may further include a measurement circuit coupled to the decision circuit. The measurement circuit may be configured to measure radio parameters indicating a communication terminal device connected to the communication device. The decision circuit may further be configured to decide whether at least one of downlink radio resources and uplink radio resources (for example, at least one of a downlink frequency band, and an uplink frequency band) can be assigned based on the measured radio parameters.

In general, the assigned resources may relate to resources in a time/frequency resource grid and may be at least one of the following: a group of single elements; a range of single elements; a combination of single elements; a single element of a radio frame; a single element of a sub frame; a single element of a time slot; a single element of a symbol; a single element of a resource block; a single element of a resource element; and a single element of a sub carrier.

The controller of the communication device may further be configured to carry out the managing of radio resources in accordance with a predefined timing. The predefined timing may be related to the assignment of a validity period for the resource allocation/management of radio resources.

The communication device may further include a short range radio communication circuit. The short range radio communication circuit may be configured to provide the direct communication terminal device to communication terminal device communication.

The short range radio communication circuit of the communication device may further be configured to provide the direct communication terminal device to communication terminal device communication in accordance with one of the following: a Bluetooth radio communication; an Ultra Wide Band radio communication; a Wireless Local Area Network radio communication; and a Long Term Evolution-Direct communication.

The communication device may further be configured as a communication terminal device.

Figure 14:
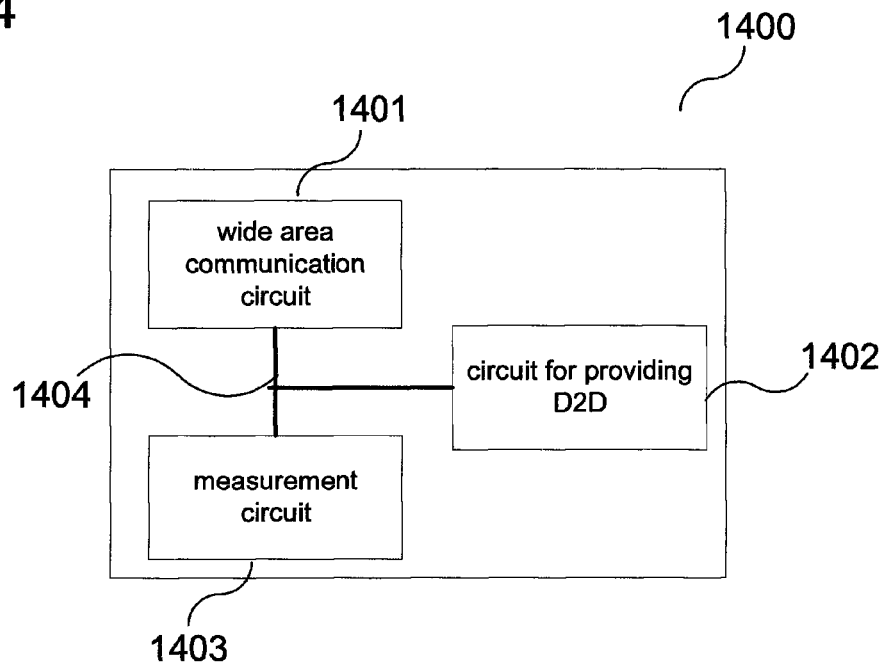
FIG. 14 shows a further communication terminal device.

FIG. 14 shows a communication terminal device.

The communication terminal device 1400 may include a cellular wide area radio communication technology circuit 1401. The cellular wide area radio communication technology circuit 1401 may be configured to provide a communication in accordance with a cellular wide area radio communication technology. The communication may be a cellular wide area radio communication between the communication terminal device and a base station of a cellular wide area radio communication network. The communication terminal device 1400 may further include a circuit 1402. The circuit 1402 may be configured to provide a direct communication terminal device to communication terminal device communication (D2D) bypassing a radio access network in accordance with information received via the radio access network. The communication terminal device 1400 may further include a measurement circuit 1403. The measurement circuit 1403 may be configured to measure radio parameters indicating interferences between a communication in accordance with a cellular wide area radio communication technology and a direct communication terminal device to communication terminal device communication. The cellular wide area radio communication technology circuit 1401, the circuit 1402 and the measurement circuit 1403 may be coupled with each other via a connection 1404 (e.g. a cable, and the like).

The cellular wide area radio communication technology circuit of the communication terminal device may further be configured to operate on a frequency division duplex (FDD) based communication.

The circuit of the communication terminal device may further be configured to operate on a time division duplex (TDD) based communication.

The communication terminal device may include a message generator configured to generate a message to a base station. The message may include at least one message field specifying a request for a direct communication terminal device to communication terminal device communication.

The circuit of the communication terminal device may further be configured to use a short range radio communication.

The short range radio communication circuit of the communication terminal device may further be configured to provide the direct communication terminal device to communication terminal device communication in accordance with one of the following: a Bluetooth radio communication; an Ultra Wide Band radio communication; a Wireless Local Area Network radio communication; and a Long Term Evolution-Direct communication.

The circuit of the communication terminal device may further be configured to operate in a direct communication terminal device to communication terminal device communication that is provided or will be provided.

Figure 15:
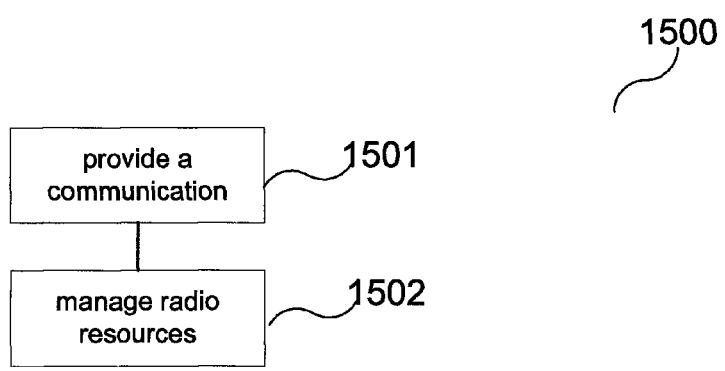
FIG. 15 shows a flow diagram illustrating a method for controlling a communication device.

FIG. 15 shows a flow diagram 1500 illustrating a method for controlling a communication device.

The method may include in 1501 providing a communication in accordance with a cellular wide area radio communication technology. The method may further include in 1502 managing radio resources for a cellular wide area radio communication connection based on radio resources that are provided or will be provided (e.g. allocated) for a direct communication terminal device to communication terminal device communication bypassing a radio access network.

The method may further include detecting a direct communication terminal device to communication terminal device communication (D2D) bypassing a radio access network.

The method may further include detecting a direct communication terminal device to communication terminal device communication in at least one of an uplink and downlink frequency band of a frequency division duplex (FDD) based communication of the communication device in accordance with the cellular wide area radio communication technology.

The method may further include releasing radio resources (e.g., resources in a time/frequency resource grid) based on a detection of a direct communication terminal device to communication terminal device communication.

The method may further include blocking radio resources (e.g., resources in a time/frequency resource grid) based on a detection of a direct communication terminal device to communication terminal device communication.

The method may further include deciding, based on information received from a controller of the communication device, whether at least one of downlink frequency resources and uplink frequency resources can be assigned for a direct communication terminal device to communication terminal device communication.

The method may further include measuring radio parameters indicating a communication terminal device connected to the communication device. The method may further include deciding whether at least one of downlink frequency resources and uplink frequency resources can be assigned based on the measured radio parameters.

In general, the assigned resources may relate to resources in a time/frequency resource grid, and may be at least one of the following a group of single elements, a range of single elements; a combination of single elements or a single element of a radio frame, a single element of a sub frame, a single element of a slot, a single element of a symbol, a single element of a resource block, a single element of a resource element and/or a single element of a sub carrier.

The combination of single elements may be a repeating pattern.

The elements may be signaled explicitly or implicitly to communication terminal devices.

The method may further include managing of radio resources in accordance with a predefined timing (for instance, assigning a validity period for the new resource allocation).

The method may further include using a time division duplex (TDD) based communication for the direct communication terminal device to communication terminal device communication.

The method may further include using a frequency division duplex (FDD) based communication for the cellular wide area radio communication.

Figure 16:
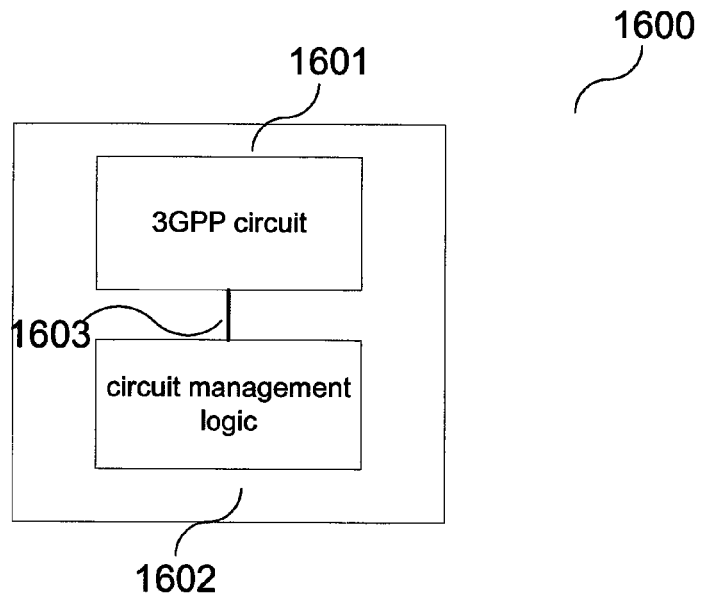
FIG. 16 shows a further communication device.

FIG. 16 shows a communication device 1600.

The communication device 1600 may include a 3GPP radio communication technology circuit 1601. The circuit 1601 may be configured to provide a communication in accordance with a 3GPP radio communication technology. The communication device 1600 may further include a logic 1602 to manage radio resources for a 3GPP radio communication connection based on information indicating a direct communication terminal device to communication terminal device communication bypassing a radio access network. The radio communication technology circuit 1601 and the logic 1602 to manage radio resources may be coupled with each other via a connection 1603 (e.g. a cable, and the like).

FIG. 17 shows a resource grid 1700 of LTE with resource assignment for D2D communication.

In FIG. 17 two example patterns are shown. FIG. 17 describes a rough granularity at Resource Block layer. The exemption of resources for "normal" traffic over the Uu interface (or allocation of resources for D2D traffic over the Ud interface when looking at it from a different angle) is signalled via System Information (SI) broadcast from the base station to all UEs. Non-overlapping resources reserved for D2D user traffic 1707 are arranged in a shared manner over different slots 1706. A resource reserved for D2D device discovery 1708 is arranged, not overlapping with the resources 1707 reserved for D2D user traffic.

FIG. 18 shows a view of a resource grid 1800 with a pattern of resource elements within a slot reserved for D2D communication.

FIG. 18 describes a more granular approach at Resource Element layer of the resource grid shown in FIG. 17. A resource block 1801 generally includes twelve subcarriers 1802, each having six or seven resource elements 1803. Non-overlapping resources reserved for D2D user traffic 1804 are arranged in a shared manner for a couple of different resource elements 1803. Resource reserved for D2D device discovery 1805 are arranged, not conflicting with the resources 1804 reserved for D2D user traffic.

Figure 19:
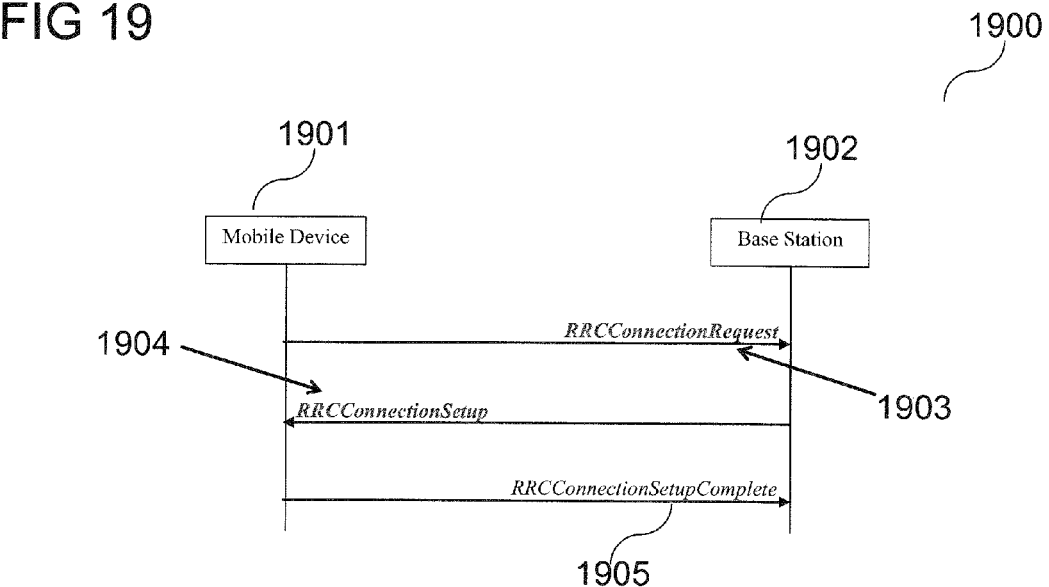
FIG. 19 shows a flow diagram illustrating a RRC connection establishment.

FIG. 19 shows a flow diagram 1900 illustrating a successful RRC connection establishment.

The mobile device (UE) 1901 sends in 1903 a RRC Connection Request RRC message to the base station 1902. The RRC Connection Request RRC message in 1903 contains the UE's 1901 request for the base station 1902 to allocate certain resources in one of its frequency bands to D2D communication. It may also include some additional pieces of (individual) information from the requesting UE 1901 and/or its D2D peer(s), for instance pertaining to the type of D2D service and/or the bandwidth demand and/or QoS requirements and/or estimated duration of D2D communication, location stamp(s) (e.g., GNSS data or RF fingerprint), and so on. This additional information will help the base station 1902 reserve and assign the right amount and the right type of resources and to select the right periodicity, respectively. In 1904 the base station sends a RRC Connection Setup RRC message to mobile device 1901. The RRC Connection Setup RRC message in 1904 contains the base station's 1901 response with the granted resource allocation in one of the cell's frequency bands (e.g., in the DL band) for D2D communication. The encoding (i.e. the information elements used) could be similar to the encoding used in the System Information broadcast (D2DConfigValidityPeriod and D2DResourceConfigCommon), if explicit resource allocation is used. In some scenarios a time offset indicating when the indicated resources will be ready (i.e., free) for D2D communication may be added. The other (pairs of) D2D-UEs residing in the same radio cell might get a different resource allocation for their D2D traffic that is specific to their individual needs. For example, the bandwidth and periodicity may differ depending on the type of D2D service announced to the base station. A first pair (or cluster) of D2D-UEs could request resources for a synchronous real-time service with small data packages for direct UE-to-UE communication (VoIP traffic characteristic), while a second pair (or cluster) of D2D-UEs in the same cell could request resources for a non real-time bulky exchange of data packets (FTP traffic characteristic).

The mobile device 1901 sends in 1905 a RRCConnectionSetup Complete message back to the base station 1902.

In order to mitigate interference between neighbouring pairs (or clusters) of D2D-UEs, one or more location stamp(s) may be included in the request (this can be either the location stamp of the requesting UE, or a location stamp of one of its peers; these could be available at the requesting UE, if the exchange of location stamps is part of the "device discovery" procedure, or the location stamp can be based on mean values and thus represent the entire cluster). Location stamps of a UE (or of a cluster) may include a set of GNSS (Global Navigation Satellite System) data (such as GPS coordinates) and/or fingerprints of the radio environment that a UE currently resides in (so-called "RF fingerprints"). The base stations may take this/these location stamp(s) into account and assign different set of resources (for instance, in the downlink or in the uplink frequency band of an LTE-FDD cell) to different clusters of D2D-UEs in order to efficiently mitigate interference between neighbouring clusters of D2D-UEs or it might assign the same resources to different clusters, if the distance between the locations is large enough to prevent interference.

In various aspects of this disclosure, the requesting UE may collect location stamps of its peers, and calculate a resulting location stamp that is valid for a pair of D2D-UEs, or an entire cluster of D2D-UEs. In various aspects of this disclosure, the requesting UE forwards its own location stamp potentially together with one or more location stamps received from or derived for its peers to the base station in order to let the the base station determine the location estimate of a pair of (or a cluster of) D2D-UEs.

Figure 20:
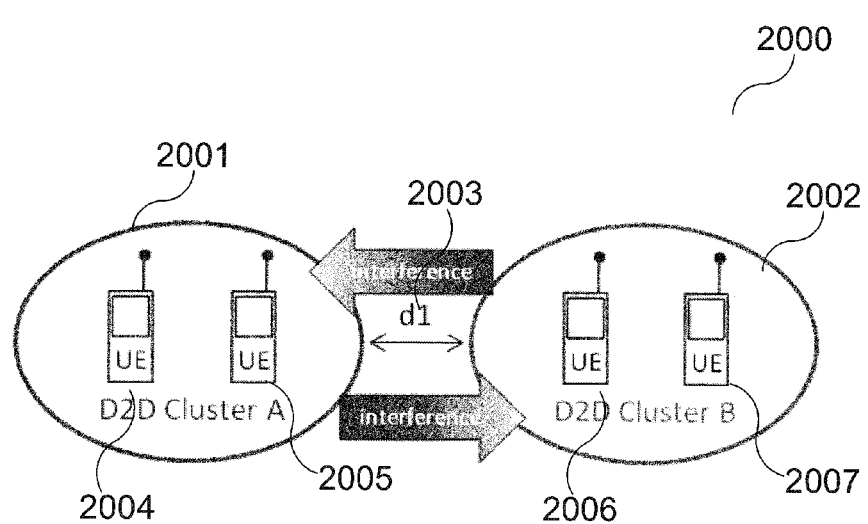
FIG. 20 shows a scenario with two clusters of D2D-UEs that are in proximity.

FIG. 20 shows a scenario 2000 with two clusters of D2D-UEs 2001, 2002 that are in proximity.

For example, in the scenario shown in FIG. 20 there are two clusters 2001, 2002 of D2D-UEs 2004, 2005, 2006, 2007 that are in proximity. The distance d1 2003 in FIG. 20 is quite short, so that an ongoing D2D communication in Cluster A 2001 may cause interference to an ongoing D2D communication in Cluster B 2002 and vice versa. The bold arrows are representing interference. Each arrow is reaching far enough to touch the other cluster's circle (or "area" or "domain").

Figure 21:
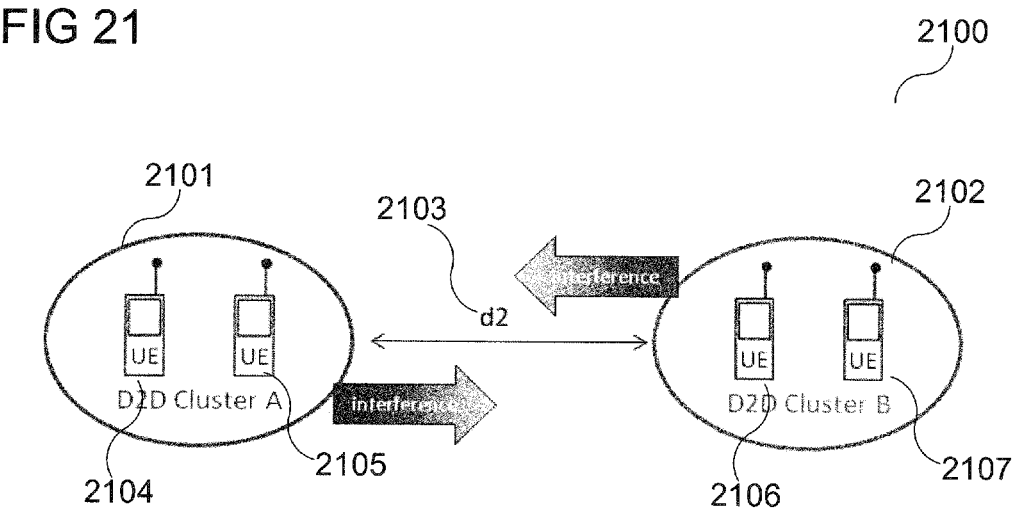
FIG. 21 shows a further scenario with two clusters of D2D-UEs that are not close to one another.

FIG. 21 shows a further scenario 2100 with two clusters of D2D-UEs 2101, 2102 that are not close to one another.

For example, in the scenario 2100 shown in FIG. 21 the two clusters, Cluster A 2101 and Cluster B 2102 of D2D-UEs 2104, 2105, 2106, 2107 are not close to one another. The distance d2 2103 may be large enough to prevent interference between the clusters 2101, 2102. The bold arrows (that are representing interference) are not reaching far enough to touch the other cluster's circle (or "area" or "domain").

From the location stamps of Cluster A 2101 and Cluster B 2102 the base station can (roughly, but still sufficiently precise for D2D resource assignment) determine how far away the two clusters are from one another. If the clusters are e.g. several hundred meters apart, the base station can be sure that both clusters do not interfere with each other. So both clusters could be assigned exactly the same resources in a radio cell for D2D communication. If the clusters are more or less located at the same spot (e.g., the base station assumes the two clusters are only a few meters apart as shown e.g. in FIG. 20), then the base station may assume that the two clusters would heavily interfere with each other as soon the mobile devices engage in direct UE-to-UE communication within their respective cluster. In this case, the base station may therefore decide to assign different sets of resources for D2D communication taking into account the proximity of the involved clusters as shown in the following described FIG. 22.

Figure 22:
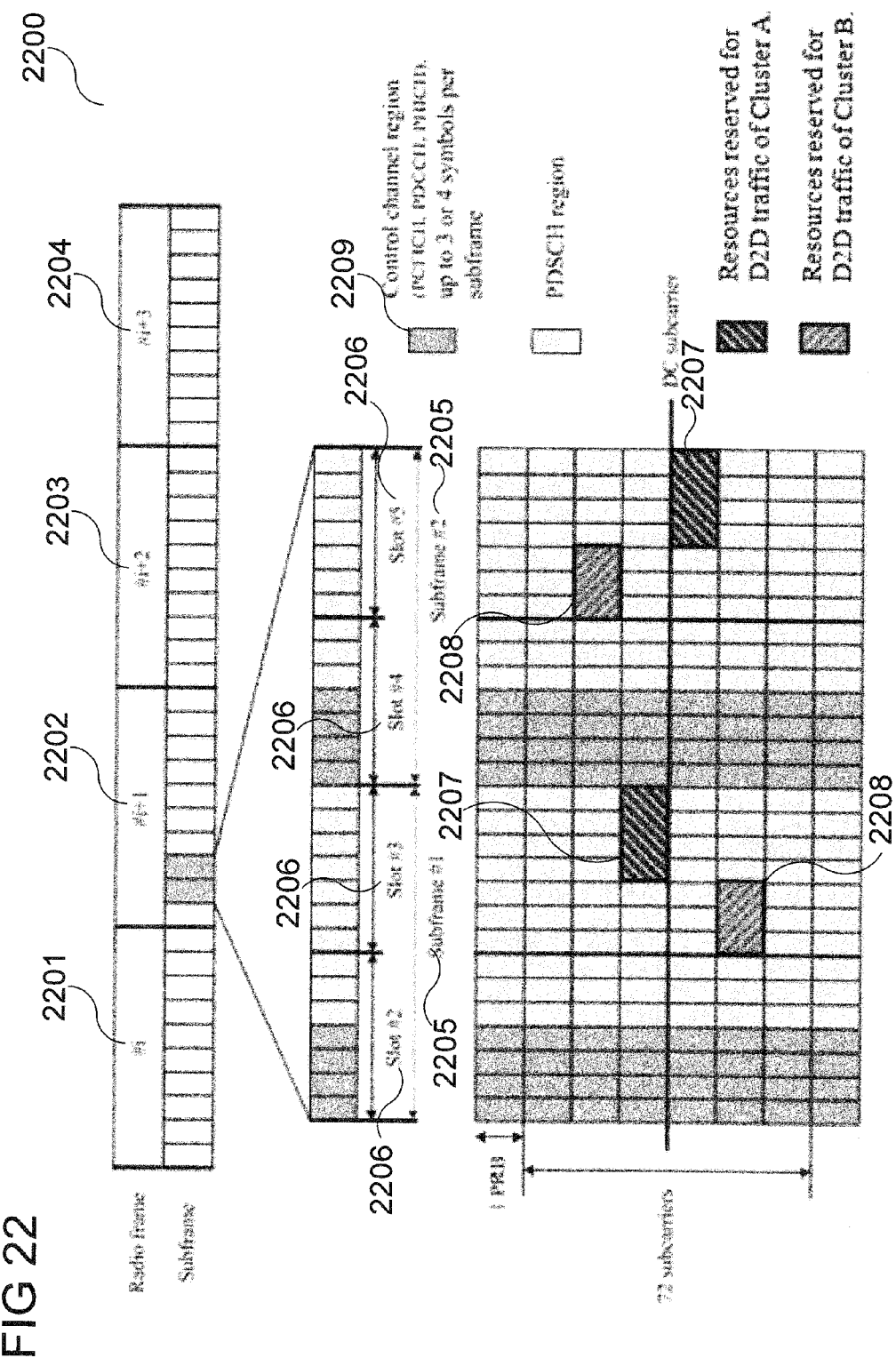
FIG. 22 shows a resource grid of LTE with resource assignment for two different groups of D2D-UEs.

FIG. 22 shows a resource grid 2200 of LTE with resource assignment for two different groups of D2D-UEs.

The resource assignment in the DL resource grid leaves the control channel region 2209 untouched. In this example, the base stations allocated more resources to the D2D Cluster A than to the D2D Cluster B. This may for example be done because of different (requested or predicted) bandwidth demands. Non-overlapping resources 2207 reserved for D2D user traffic for Cluster A may be arranged in a shared manner over different slots 2206. Resources 2208 reserved for D2D user traffic for Cluster B are arranged, not overlapping with the resources 2207 reserved for D2D user traffic for Cluster A.

Figure 23:
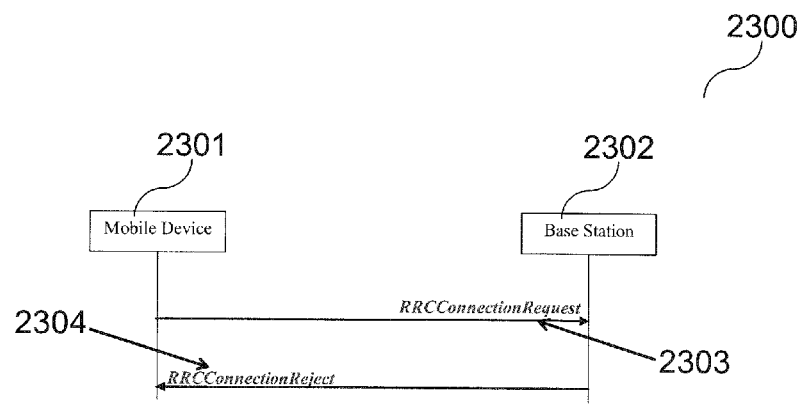
FIG. 23 shows a flow diagram illustrating a network reject for a RCC connection establishment.

FIG. 23 shows a flow diagram 2300 illustrating a network reject for a RCC connection establishment.

FIG. 23 shows the unsuccessful ("Network Reject") case. The mobile device (UE) 2301 sends in 2303 a RRC Connection Request RRC message to the base station 2302. The RRC Connection Request RRC message in 2303 contains the UE's 2301 request for the base station 2302 to allocate certain resources in one of its frequency bands to D2D communication. It may also include some additional pieces of (individual) information from the requesting UE 2301 and/or its D2D peer(s), for instance pertaining to the type of D2D service and/or the bandwidth demand and/or QoS requirements and/or estimated duration of D2D communication, location stamp(s) (e.g., GNSS data or RF fingerprint), and so on. This additional information will help the base station 2302 if possible, reserve and assign the right amount and the right type of resources and to select the right periodicity, respectively. The RRC Connection Reject RRC message in 2304 may contain information that no resources were (or could be) assigned for direct UE-to-UE communication in neither the UL frequency band nor in the DL frequency band of an LTE-FDD cell, and probably additional information, such as a reason for not assigning any resources for D2D, an allowance for the UE to ask again for a resource allocation, a threshold for max tx power for the UE in D2D communication, a general prohibition to activate direct UE-to-UE communication, time restrictions for the latter four, and so on.

Figure 24:
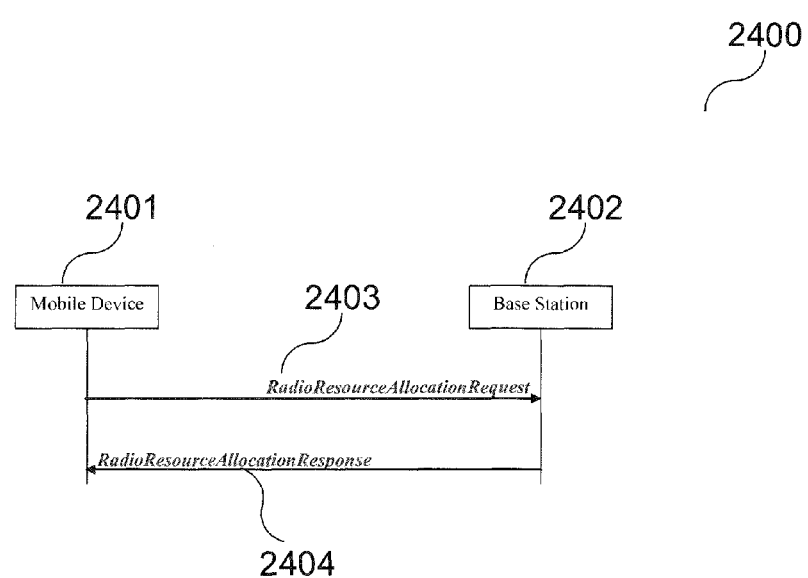
FIG. 24 shows a further flow diagram illustrating a new pair of RRC message.

FIG. 24 shows a further flow diagram 2400, illustrating a new pair of RRC messages, namely Radio Resource Allocation Request in 2403 and Radio Resource Allocation Response in 2404, that can be used by a UE 2401 (Mobile Device) when an RRC connection to the base station 2402 is already up and running (over the Uu interface) and a D2D communication over the Ud interface is imminent.

resources for direct UE-to-UE communication in at least one D2D Cluster (here: in up to MaxNumberD2DCluster D2D Clusters).

The information element D2DConfig may be defined for implicit signalling.

The content of the information element may be as follows:

```
-- ASN1START
  D2DConfig ::=    SEQUENCE (SIZE (1..MaxNumberD2DCluster)) OF
D2DResourceContainer
  D2DResourceContainer ::=   SEQUENCE {
  D2DFrequencyBand                ENUMERATED (DL, UL)
  D2DClusterIdentifier            INTEGER (0..31)
  D2DConfigTimingOffset           ENUMERATED {s1, s2, ..., s60,
s120}
  D2DConfigValidityPeriod         ENUMERATED {s4, s8, ..., s64,
s128, s256, s512}
  D2DResourceConfigRuleDedicated  INTEGER (0..9)
  D2DResourceConfigStartParameter D2DResourceConfigStartParameter
  }
-- ASN1STOP
```

Alternatively, the RRC Connection Setup (1904 in FIG. 19) and the Radio Resource Allocation Response (2404 in FIG. 24) RRC messages may use one viable variant ("implicit resource allocation") of a new Information Element (IE) to assign resources for direct UE-to-UE communication in at least one D2D Cluster.

For D2D communication in the uplink band in general two resource allocation schemes Type 0 and Type 1 are supported for PDCCH/EPDCCH. If the resource allocation type information is not present, only resource allocation type 0 is supported. For Uplink Resource Allocation Type 0 the $RB_{START}$ (starting resource block) and $L_{CRBs}$ (length, in terms of contiguously allocated resource blocks) should be signaled. For Uplink Resource Allocation Type 1 M (number of preferred subbands of size k) have to be signaled. Together with parameter N the combinatorial index (r) may be calculated. Additionally, frequency-Hopping may be switched on or of.

The information element structure for the LTE uplink band may be as follows:

```
-- ASN1START
  D2DConfig ::=                   SEQUENCE (SIZE (1..MaxNumberD2DCluster)) OF
D2D-UL-Resource-Calculation
  D2D-UL-Resource-Calculation ::= SEQUENCE {
  Type                            ENUMERATED (0, 1)
  Parameters::= CHOICE {
  Type0 ::= SEQUENCE {
  D2D-Cluster-Identifier          INTEGER (0..63)
  RBStart                         INTEGER (0..31)
  LCRBs                           INTEGER (0..31)
  }
  Type1 ::= SEQUENCE {
  D2D-Cluster-Identifier          INTEGER (0..63)
  M                               INTEGER (0..31)
  }
  Frequency-Hopping               BOOLEAN
  Frequency-Hopping-Offset        INTEGER (0..3)
  }
-- ASN1STOP
```

The RRC Connection Setup (1904 in FIG. 19) and the Radio Resource Allocation Response (2404 in FIG. 24) RRC messages may use one viable variant ("implicit resource allocation") of a new Information Element (IE) to assign For D2D communication in the downlink band in general two resource allocation schemes Type 0 and Type 1 are supported for PDCCH/EPDCCH. If the resource allocation type information is not present, only resource allocation type 0 is supported. For Downlink Resource Allocation Type 0 a Resource Block Group (RBG) assignment bitmap will be signaled, in order to calculated the resource block group size (P). For Downlink Resource Allocation Type 1 a Resource Block Group Subset (RBG Subset), including a shift of the Resource Allocation Span (RAS shift) and a Resource Block Group (RBG) assignment bitmap has to be signaled, in order to calculated the resource block group size (P).

The information element structure for the LTE downlink band may be as follows:

```
-- ASN1START
    D2DConfig ::=       SEQUENCE (SIZE (1..MaxNumberD2DCluster)) OF
D2D-DL-Resource-Calculation
    D2D-DL-Resource-Calculation ::=     SEQUENCE {
    Type                    ENUMERATED (0, 1)
    Parameters::= CHOICE {
    Type0 ::= SEQUENCE {
    D2D-Cluster-Identifier    INTEGER (0..63)
    RBG-Assignment-Bitmap OCTET STRING (size(1..4))
    }
    Type1 ::= SEQUENCE {
    D2D-Cluster-Identifier    INTEGER (0..63)
    RBG-Subset              INTEGER (1..4)
    RAS-shift               INTEGER (0..1)
    RBG-Assignment-Bitmap OCTET STRING (size(1..4))
    }
    }
-- ASN1STOP
```

Other rules used for resource allocation, which are specialized on D2D communication may be used too.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
a cellular wide area radio communication technology circuit to provide a cell according to a cellular wide area radio communication technology;
a controller to:
manage a first plurality of radio resources that are to be used for discovery of a communication terminal device for a direct communication terminal device to communication terminal device communication bypassing a radio access network;
detect the direct communication terminal device to communication terminal device communication bypassing the radio access network;
free, based on the detection, a second plurality of radio resources that are to be used for the direct communication terminal device to communication terminal device communication, wherein the first plurality of radio resources do not conflict with the second plurality of radio resources; and
transmit, based on said detection and freeing, to a communication terminal device engaged in the direct communication terminal device to communication terminal device communication, an indication of the freeing of the second plurality of radio resources,
wherein the first plurality of radio resources and the second plurality of radio resources are restricted to either an uplink frequency band of the cell or a downlink frequency band of the cell.

2. The communication device according to claim 1, wherein the controller is to detect the direct communication terminal device to communication terminal device communication in an uplink or downlink frequency band of a frequency division duplex based communication of the communication device according to the cellular wide area radio communication technology.

3. The communication device according to claim 1, wherein to manage the second plurality of radio resources comprises to release radio resources of the second plurality of radio resources.

4. The communication device according to claim 1, wherein to manage the second plurality of radio resources comprises to block radio resources from the second plurality of radio resources.

5. The communication device according to claim 1, further comprising:
a decision circuit to decide, based upon information received from the controller, whether downlink radio resources or uplink radio resources can be assigned for the direct communication terminal device to communication terminal device communication.

6. The communication device according to claim 5, further comprising:
a measurement circuit, coupled to the decision circuit, to measure radio parameters indicating a communication terminal device connected to the communication device;
wherein the decision circuit is to decide whether downlink radio resources or uplink radio resources can be assigned based on the measured radio parameters.

7. The communication device according to claim 5, wherein the assigned radio resources is:
a group of single elements;
a range of single elements;
a combination of single elements;
a single element of a radio frame;
a single element of a sub frame;
a single element of a time slot;
a single element of a symbol;
a single element of a resource block;
a single element of a resource element; or
a single element of a sub carrier.

8. The communication device according to claim 1, wherein the controller is further to carry out the management of at least one of the first or second pluralities of radio resources according to a predefined timing.

9. The communication device according to claim 8, wherein the predefined timing is related to the assignment of a validity period for the resource allocation or management of radio resources.

10. The communication device of claim 1, wherein the first plurality of radio resources does not conflict with the second plurality of radio resources based on different frequency resource allocations between the first plurality of radio resources and the second plurality of radio resources.

11. The communication device of claim 1, further comprising:
a signaling circuit to signal, to the communication terminal device, an indication of at least one of the first plurality of radio resources or the second plurality of radio resources in a system information block (SIB).

12. The communication device of claim 1, wherein the detection of the direct communication terminal device to communication terminal device communication bypassing the radio access network is based on a measurement report transmitted by a communication terminal device that is not to engage in the communication terminal device to communication terminal device communication.

13. The communication device of claim 1, wherein the detection of the direct communication terminal device to communication terminal device communication bypassing the radio access network is based on one or more missing acknowledgments in an uplink direction.

14. A communication device, comprising:
- a 3GPP radio communication technology circuit to provide a communication in accordance with a 3GPP radio communication technology; and
- a logic to:
  - manage a first plurality of radio resources for a discovery procedure associated with a direct communication terminal device to communication terminal device communication bypassing a radio access network;
  - detect the direct communication terminal device to communication terminal device communication bypassing the radio access network;
  - release a second plurality of radio resources that does not conflict with the first plurality of radio resources for the direct communication terminal device to communication terminal device communication based on the detection, and
  - transmit, based on said detection and release, to a communication terminal device engaged the direct communication terminal device to communication terminal device communication, an indication of the release of the second plurality of radio resources,
- wherein the first plurality of radio resources and the second plurality of radio resources restricted to either an uplink frequency band of the cell or a downlink frequency band of the cell.

* * * * *